US012487876B2

(12) United States Patent
Agrawal et al.

(10) Patent No.: US 12,487,876 B2
(45) Date of Patent: Dec. 2, 2025

(54) LANGUAGE MODEL ASSISTED ERROR ANALYSIS SYSTEM

(71) Applicant: Palantir Technologies Inc., Denver, CO (US)

(72) Inventors: Akshay Agrawal, Jersey City, NJ (US); Ndeye Fatou Diop, Asnières-sur-seine (FR); Frauke Hein, London (GB); Christopher Jeganathan, London (GB); Oleh Igorovych Busko, London (GB); Claudia Rafaela Rogoz, Zurich (CH); Dauren Abdykaparov, London (GB); Philipp Shchekin, New York, NY (US); Ryan Norris, Newnham (GB); Sudarshan Sanjay Ruikar, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/735,057

(22) Filed: Jun. 5, 2024

(65) Prior Publication Data

US 2025/0147832 A1  May 8, 2025

Related U.S. Application Data

(60) Provisional application No. 63/559,421, filed on Feb. 29, 2024, provisional application No. 63/596,491, filed on Nov. 6, 2023.

(51) Int. Cl.
*G06F 11/07* (2006.01)
(52) U.S. Cl.
CPC ...... *G06F 11/0769* (2013.01); *G06F 11/0706* (2013.01); *G06F 11/079* (2013.01); *G06F 11/0793* (2013.01)

(58) Field of Classification Search
CPC ............. G06F 11/0706; G06F 11/0709; G06F 11/0769; G06F 11/079; G06F 11/0793; G06F 40/197
See application file for complete search history.

(56) References Cited

U.S. PATENT DOCUMENTS

| 7,958,486 B2 | 6/2011 | Tsyganskiy et al. |
| 11,003,568 B2 | 5/2021 | Smith et al. |

(Continued)

FOREIGN PATENT DOCUMENTS

WO    WO-2024158524 A1 *  8/2024  .......... G06F 11/0793

OTHER PUBLICATIONS

Chi, Jianlei; Yu Qu; Ting Liu; Qinghua Zheng; and Heng Yin. "SeqTrans: Automatic Vulnerability Fix via Sequence to Sequence Learning." IEEE Transactions on Software Engineering, vol. 49, No. 2; Mar. 7, 2022; pp. 564-585. (Year: 2022).*

(Continued)

*Primary Examiner* — Joseph R Kudirka
(74) *Attorney, Agent, or Firm* — Knobbe, Martens, Olson & Bear, LLP

(57) ABSTRACT

Computer-implemented systems and methods including language models for explaining and resolving code errors. A computer-implemented method may include: receiving or accessing a log comprising an error message, the error message indicating an error in code; determining the error message from the log; determining a context associated with the error; generating a prompt for a large language model ("LLM"), the prompt comprising at least: the error message, and the context associated with the error; transmitting the prompt to the LLM; and receiving an output from the LLM in response to the prompt, the output comprising at least: an explanation of the error message, and a suggested fix for the error.

18 Claims, 9 Drawing Sheets

(56) References Cited

U.S. PATENT DOCUMENTS

| | | | |
|---|---|---|---|
| 11,262,984 B2 | 3/2022 | Svyatkovskiy et al. | |
| 2024/0403438 A1* | 12/2024 | Chan | G06F 11/0793 |
| 2024/0420189 A1* | 12/2024 | Vajjiparti | G06F 9/451 |
| 2025/0045148 A1* | 2/2025 | Acharya | G06F 11/079 |

OTHER PUBLICATIONS

Xia, Chunqiu Steven and Lingming Zhang. "Keep the Conversation Going: Fixing 162 out of 337 bugs for $0.42 each using ChatGPT." Retrieved from: https://arxiv.org/abs/2304.00385; Apr. 1, 2023; 12 pages. (Year: 2023).*

Leinonen et al., "Using large language models to enhance programming error messages", Proceedings of the 54th ACM Technical Symposium on Computer Science Education, Mar. 15-18, 2023, pp. 563-569.

[Product Launch] Error summarization experiment, Feedback & Bug Reports, Product Feedback, Sep. 2023, https://discuss.circleci.com/t/product-launch-error-summarization-experiment/49203, accessed on Jun. 20, 2024, 4 pages.

Santos et al., "Syntax and *sensibility*: Using language models to detect and correct syntax errors", Department of Computing Science, University of Alberta, Edmonton, Alberta, Canada, 2018 IEEE 25th International conference on Software Analysis, pp. 1-12 (2018).

\* cited by examiner

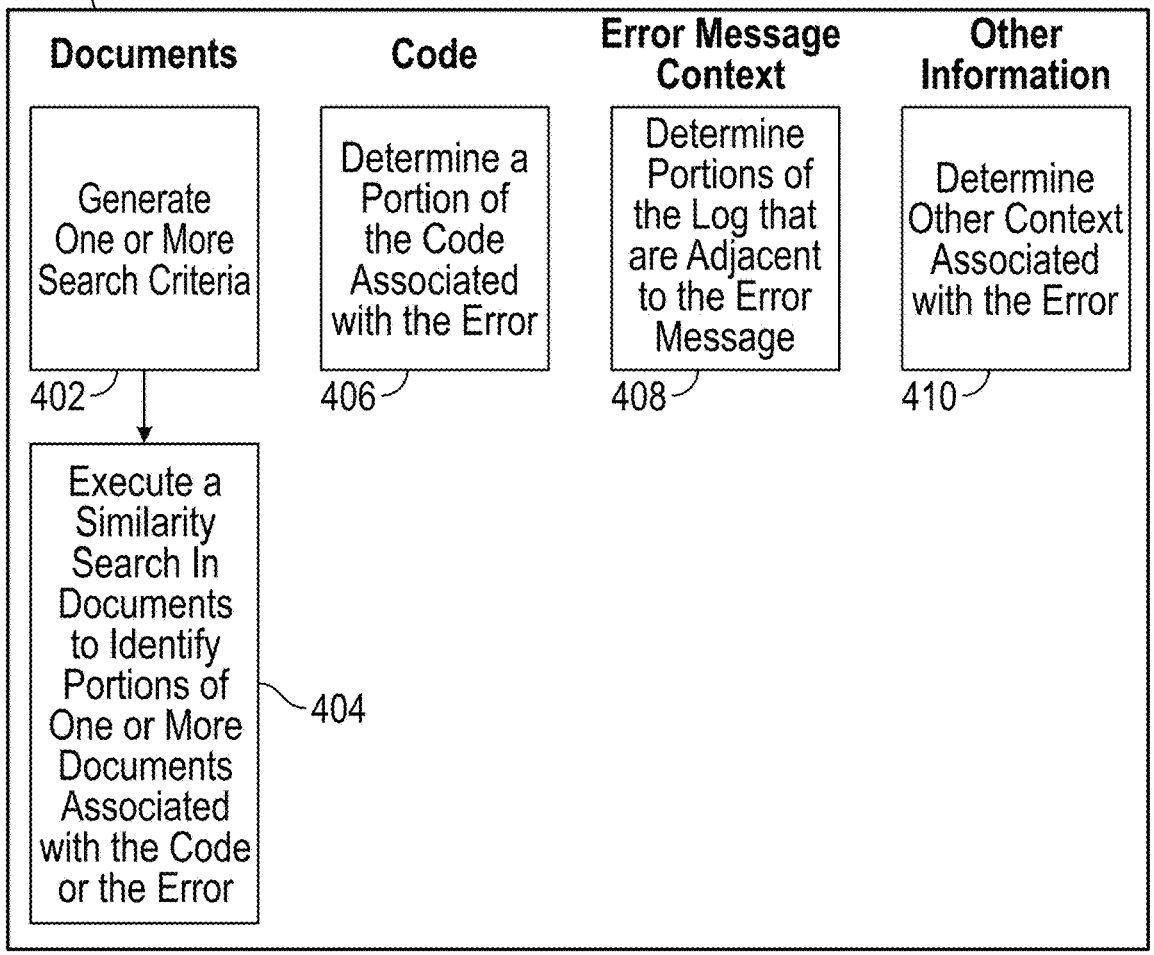
FIG. 4A
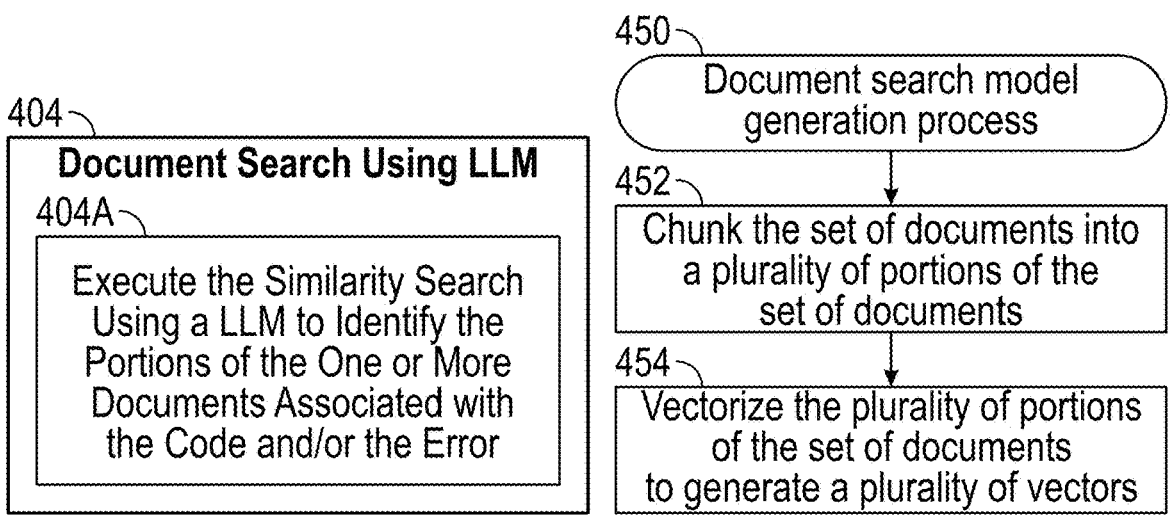
FIG. 4B
FIG. 4C

```
                                                                    Service Name    identification number    [icon] 0

500 ─┐        ┌─ 502
     │        │
  ○ FAILED
  ⊗ YYYY-MM-DD tttt (2 moths ago), took 3m 32s 193ms
  ▽ Log Messages
  Checks (took 3m 22s 764ms)    ─ 510

∴ Task name 1   | SKIPPED | 0.0 secs
  ∴ Task name 2   | UNKNOWN | 0.0 secs
  ∴ Task name 3   | SKIPPED | 0.0 secs    ← 512
  FAILURE: Build failed with an exception.
  * What went wrong: ← 514
  Execution failed for task :Task name 4.
  > Execution failed with non-zero exit code: 1

[STDERR] ← 516
  Traceback (most recent call last):
    File " Filepath1/ Filename1, Line 11, in <module:>
      sys.exit(main())
    File " Filepath2/ Filename2, Line 45, in main args.function(args)
    File " Filepath3/ Filename3, Line 56, in main pipeline = pipeline.from_entry_point()
    File " Filepath4/ Filename4, in main Line 220, in._from_entry_point
    File " Filepath5/ Filename5, in main Line 2471, in.Load
                                    ↑ 518
  SyntaxError: invalid syntax

[STDOUT]
```

FIG. 5

```
1   You are Error Assist that follows the rules: ←——602
2   - Using the given information about a failing job ({jobType}), write a short summery of why it failed, followed by a suggestion of how to fix it.
3   - If unsure of the cause of the failure, or how to fix it suggest the user consult with system support rather then try to give a fix suggestion.
4   - If the error looks like an internal error (eg, not something the user can fix in their code), give a vague apology and suggest contacting system support.
5   - If possible, indicate the line(s) of code which may have caused the problem.
6   - If possible, suggest a code change which may resolve the problem in a single block in the style of a minimal git diff inside a markdown code block.
7   - You must include links to the source you used from the documentation, if available, only include links that are present in the documentation.
8   - Always talk directly to the user using language like "you can try", "your code", etc.
9   - Answer in the language the user asked in, you're multilingual and are able to translate the documentation when needed.
10
11  {{documents}} ←——604
12
13  {{code}} ←——606
14
15  {{error message context}} ←——608
16
17  Error: {{error message}} ←——610
```

○ FAILED
ⓘ YYYY-MM-DD tt:tt (2 months ago), took 3m 32s 193ms

▽ Log Message
Checks (took 3m 22s 764ms)

⚅ Explain the logs [Beta]  |  Use the power of AI to generate an explanation for the following logs.

The check failed due to a syntax error in your code. The error is in the file code filename at line 37. it seems that the def keyword is missing the function name and its parameters. ← 802

To fix this issue, you should complete the function definition by adding the function name and its parameters. For example, if you intended to define a function called my_ function with a single parameter x, you should update line 37 like this: ← 804

- def
+ def my_function(x) :  ← 804
                        ↖ 806

After fixing the syntax error, you can try running the check again. if you still encounter issues, please consult with system support.

Service Name    identification number provide feedback about the explanation

FIG. 8

LANGUAGE MODEL ASSISTED ERROR ANALYSIS SYSTEM

CROSS-REFERENCE TO RELATED APPLICATIONS

This application claims benefit of U.S. Provisional Patent Application No. 63/596,491, filed Nov. 6, 2023, and titled "LLM-POWERED REMOTE WORKSPACE ERROR-ENHANCER," and U.S. Provisional Patent Application No. 63/559,421, filed Feb. 29, 2024, and titled "LANGUAGE MODEL ASSISTED ERROR ANALYSIS SYSTEM." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for utilizing computer-based models. More specifically, the present disclosure relates to computerized systems and techniques including large language models for analysis and resolution of software program code errors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations utilizing one or more computer-based models. For example, language models can be utilized to provide and/or predict a probability distribution over sequences of words.

SUMMARY

The systems, methods, and devices described herein each have several aspects, no single one of which is solely responsible for its desirable attributes. Without limiting the scope of this disclosure, several non-limiting features will now be described briefly.

Computer-based platforms may provide various applications by executing software instructions and/or other executable code written in any combination of one or more programming languages. However, errors may be encountered while compiling or executing code, and it may be difficult to analyze errors when code becomes more complex or powerful. For example, the complexity of modern code bases may require review, analysis, and understanding of large amounts of data and information (e.g., large volumes of documentation, many code files, analysis on changes to code files, or the like) to effectively analyze code errors. Although a Large Language Model ("LLM") can be utilized to analyze an error, some LLMs may only handle prompts within a limited size and may be inefficient in analyzing a large corpus of code or error logs that include both information related and unrelated to the error. Further, some LLMs may hallucinate (e.g., generate factually incorrect or nonsensical information) or be ineffective in analyzing code errors when operating on prompts that are generic or include insufficient context to the error.

The present disclosure implements systems and methods (generally collectively referred to herein as "an error analysis system" or simply a "system") that can advantageously overcome various of the technical challenges mentioned above, among other technical challenges. For example, various implementations of the systems and methods of the present disclosure can advantageously employ one or more LLMs for explaining, based on prompt generation including context relevant or specific to a code error, the code error recorded in a log that is generated while utilizing code to implement a service. The one or more LLMs may further suggest a code fix based on the prompt. Advantageously, the system can enable effective code errors analysis and/or fixes, by providing context most associated with the code errors to one or more LLMs. Thus, prompts for the LLMs may not exceed a size limit and may enable LLMs to effectively analyze code errors. Additionally, LLM(s) may generate outputs that more accurately explain code errors and/or pinpoint associated issues based on prompts tailored to the code errors.

Various embodiments of the present disclosure provide improvements to various technologies and technological fields. For example, as described above, the system may advantageously generate a prompt for an LLM based on context most associated with a code error for enabling one or more LLMs to accurately explain the code error and/or suggest a code fix based on the prompt. Other technical benefits provided by various embodiments of the present disclosure include, for example, enabling LLM(s) to more effectively pinpoint associated issues based on prompts tailored to the code errors, and automatically fixing code errors.

Additionally, various implementations of the present disclosure are inextricably tied to computer technology. In particular, various implementations rely on detection of user inputs via graphical user interfaces, calculation of updates to displayed electronic data based on those user inputs, automatic processing of related electronic data, application of language models and/or other artificial intelligence, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various implementations cannot reasonably be performed by humans alone, without the computer technology upon which they are implemented. Further, the implementation of the various implementations of the present disclosure via computer technology enables many of the advantages described herein, including more efficient interaction with, and presentation of, various types of electronic data.

According to various implementations, large amounts of data are automatically and dynamically calculated interactively in response to user inputs, and the calculated data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, models and model-related data, and may enable a user to more quickly and accurately access, navigate, assess, and digest the model-related data than previous systems.

Further, the interactive and dynamic user interfaces described herein are enabled by innovations in efficient interactions between the user interfaces and underlying systems and components. For example, disclosed herein are improved methods for analyzing, explaining, and fixing code errors, utilizing one or more LLMs, based on context most associated with the code errors. According to various implementations, the system (and related processes, functionality, and interactive graphical user interfaces), can advantageously employ one or more LLMs for explaining, based on prompt generation including context relevant or specific to a code error, the code error recorded in a log that is generated while utilizing code to implement a service. The one or more LLMs may further suggest a code fix based on the prompt. Advantageously, the system can enable effective code errors analysis and/or fixes, by providing context most associated with the code errors to one or more LLMs. Thus, prompts for the LLMs may not exceed a size limit and may enable LLMs to effectively analyze code errors. Additionally, LLM(s) may generate outputs that more accurately explain code errors and/or pinpoint associated issues based on prompts tailored to the code errors.

Thus, various implementations of the present disclosure can provide improvements to various technologies and technological fields, and practical applications of various technological features and advancements. For example, as described above, existing computer-based model management and integration technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management of various types of electronic data (including computer-based models).

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise one or more computer-readable storage mediums having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums are disclosed, wherein the computer-readable storage medium(s) have program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4A is a flowchart illustrating an example routine for determining the context associated with a code error, according to various embodiments of the present disclosure;

FIG. 4B is a flowchart illustrating an example routine for executing a similarity search to identify portions of one or more documents associated with code, according to various embodiments of the present disclosure;

FIG. 4C is a flowchart illustrating an example routine for generating a document search model that may be utilized to execute a similarity search, according to various implementations of the present disclosure;

FIG. 5 shows an example user interface of the error analysis system including an example log that includes at least an error message indicating a code error, according to various implementations of the present disclosure;

FIG. 6 shows an example prompt for an LLM, according to various implementations of the present disclosure;

FIGS. 7 and 8 are illustrations of example user interfaces of the error analysis system, according to various implementations of the present disclosure.

DETAILED DESCRIPTION

Figure 1A:
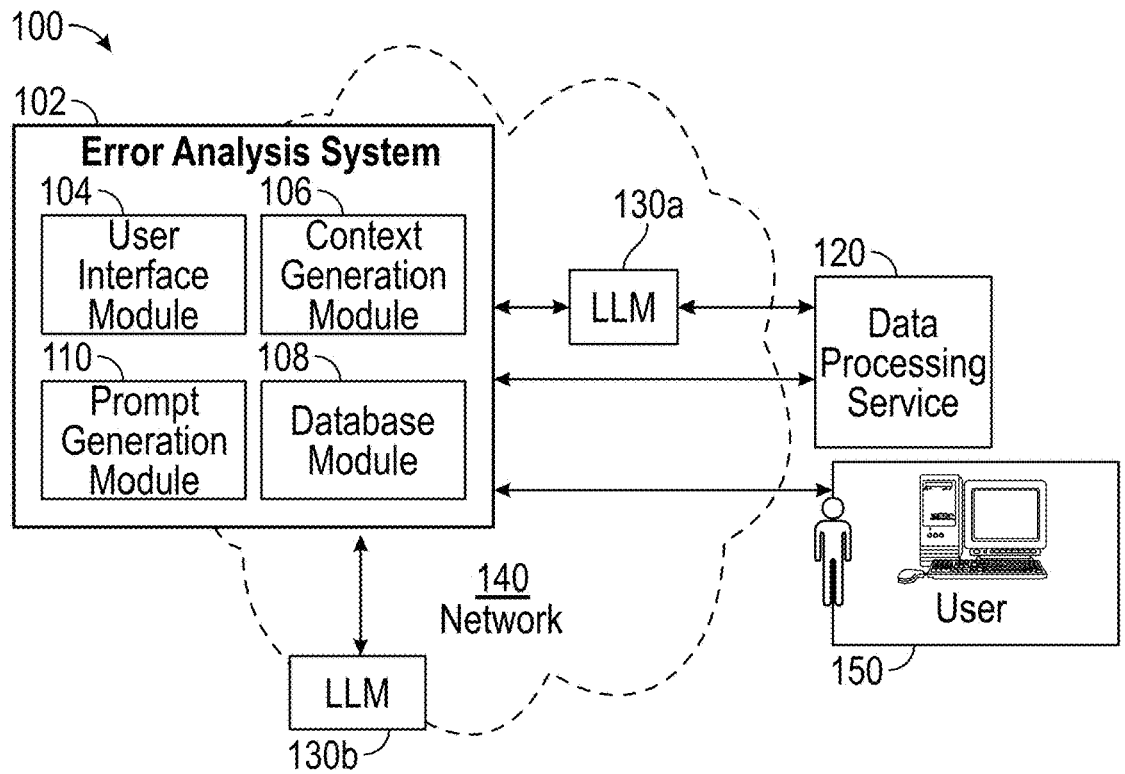
FIG. 1A is a block diagram illustrating an example error analysis system in an example computing environment, according to various implementations of the present disclosure.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

As mentioned above, computer-based platforms may provide various applications by executing software instructions and/or other executable code written in any combination of one or more programming languages. However, errors may be encountered while compiling or executing code, and it may be difficult to analyze errors when code becomes more complex or powerful. For example, the complexity of modern code bases may require review, analysis, and understanding of large amounts of data and information (e.g., large volumes of documentation, many code files, analysis on changes to code files, error logs and stack traces that can be quite lengthy, or the like) to effectively analyze code errors. Although a Large Language Model ("LLM") can be utilized to analyze an error, some LLMs may only handle prompts within a limited size and may be inefficient in analyzing a large corpus of code or error logs that include both information related and unrelated to the error. Further, some LLMs may hallucinate (e.g., generate factually incorrect or nonsensical information) or be ineffective in analyzing code errors when operating on prompts that are generic or include insufficient context to the error.

As also noted above, the present disclosure implements systems and methods (generally collectively referred to herein as "an error analysis system" or simply a "system") that can advantageously overcome various of the technical challenges mentioned above, among other technical challenges. For example, various implementations of the systems and methods of the present disclosure can advantageously employ one or more LLMs for explaining, based on prompt generation including context relevant or specific to a code error, the code error recorded in a log that is generated while utilizing code to implement a service. The one or more LLMs may further suggest a code fix based on the prompt. Advantageously, the system can enable effective code errors analysis and/or fixes, by providing context most associated with the code errors to one or more LLMs. Thus, prompts for the LLMs may not exceed a size limit and may enable LLMs to effectively analyze code errors. More specifically, the system may utilize semantic search to identify portions of documents more relevant to the code error, and include the portions into prompts for the LLMs to avoid the prompts exceeding the size limit. In situations where a prompt still exceeds the size limit, the system may further trim (e.g., keeping a portion that is most relevant to the code error) the prompt such that the prompt is not too long for an LLM. Additionally, LLM(s) may generate outputs that more accurately explain code errors and/or pinpoint associated issues based on prompts tailored to the code errors.

More specifically, the system may receive or access a log (e.g., an error log) that includes one or more error messages. Each of the one or more error messages may indicate a code error. In response to receiving a user request and/or a triggering event to analyze an error, the system may search the log to determine an error message that indicates a code error. Based on the log and/or the error message, the system may further search and determine a context associated with the error. The context may include the code, portions of the log that are close or more related to the error message, portions of one or more documents associated with the code, and/or additional information (e.g., ontology associated with a service that utilizes the code, search results from search engines) relevant to the error or useful for one or more LLMs to explain the error message. For example, the additional information may be generated by retrieving data (e.g., certain text relevant to the log, the code, and/or the code error) stored in the ontology associated with the service that utilizes the code. The retrieved data may be included in the context. Additionally, the system may generate detailed and/or specific instructions for instructing the one or more LLM(s) on operations to perform with respect to the error message and the context associated with the error. As used in the present disclosure, the term "code error" can be used synonymously or interchangeably with the term "error," "error of code," "error in code," and/or the like, to refer to any types of errors (e.g., a compile time error, a run time error, a syntax error, an overflow error, and/or the like) associated with executing software instructions and/or other executable code written in any combination of one or more programming languages.

Based on the error message, the context associated with the error, and/or the instructions, the system may generate a prompt for an LLM. The prompt may include the error message, the context associated with the error, and instructions that guide the LLM to utilize the error message and context to explain the error message. The system may transmit the prompt to the LLM, and receive an output from the LLM. The output may include an explanation of the error message, and a suggested fix for the error. Additionally and/or optionally, the system may provide the output to a user through a user interface and/or generate a code change based on the output. The system may fix the error using the code change automatically, or responsive to a user approval.

Example Features Related to Error Message Search

As noted above, the system may receive or access a log that includes error messages indicating one or more errors in code. The log may be generated by a software when implementing an application or a service (e.g., running a data processing pipeline, compiling a software package, or the like). The log may include information related to a code error (also referred to as "an error"), such as an error message that informs the error, a type of the error (e.g., compile time error, run time error, a syntax error, an overflow error, or the like), the name and or file-path of the code associated with the error, timestamps associated with the error, or other information related to the error. The log may further include various information associated with implementations of the application or the service (e.g., code accessed by a service, resources utilized by a service, name or purpose of a service, a user profile of a user requesting the service, various events occurred while providing the service, or the like). The log may be stored as various types of data files (e.g., text) in a database or storage accessible to the system. The log may be large in size (e.g., containing over thousands of lines, or having a file size over several kilobytes or megabytes) and/or include information unrelated to the error. The log may be generated by a compiler while compiling a set of code for effecting a service, and may record various resources and/or information (e.g., libraries, variables, data files, or the like) utilized to build the set of code besides error messages indicating errors (e.g., an improper function call lacking certain parameters) in some of the set of code.

The system may search the log to identify or determine at least an error message indicating a code error. The error message may include one or more text strings (e.g., "error," "failure," "what went wrong," or the like) that indicate an occurrence of the error. The error message may further indicate a portion of code that is associated with the error, such as specifying that a syntax error occurs at a particular line of code. The system may perform the search in response to receiving a user request and/or a triggering event (e.g., upon monitoring that an error log is generated and stored in a particular file repository) to analyze the log. The system may utilize various search techniques to identify or determine the error message from the log. For example, the system may execute a semantic search based on mathematical representations of portions of the log and/or the error message. As another example, the system may execute a similarity search based on regular expressions ("regex") associated with the error message.

Example Features Related to Error Context Generation

Based on a log and/or an error message, the system may determine a context associated with the error indicated by the error message. The context associated with the code error may include the code, portions of the error log that are close or more related to the error message, portions of one or more documents associated with the code, citations of the one or more documents, and/or any other information (e.g., ontology associated with a service that utilizes the code, search results from search engines) that may be relevant to the error or useful for explaining the error message or suggesting a fix for the error. The system may employ various search and data processing techniques to identify and obtain the context associated with the error.

The system may identify and retrieve, based on the error message indicating a code error, at least a portion of the code from a file repository that stores the code. The file repository may be internal (e.g., managed by the system) or external (e.g., managed by another system or a third-party) to the system. The error message may specify a syntax error in a line of the code along with a file-path or filename of the code. Based on the line, the file-path, and/or the filename of the code, the system may access the code or a portion of the code from a repository that stores the code. Additionally and/or optionally, the system may access the code based on other information in a log that includes the error message. For example, portions of the log that are adjacent to the error message and/or particular parts of the log that can be identified based on a structure of the log may include information indicating which repository or file-path stores the code. Besides accessing at least a portion of the code, the system may additionally and/or optionally access a difference between multiple versions of at least a section of the code. The difference may record changes made to at least the section of the code across various versions. The system may access the difference using some code management tool or code difference generation command. For example, the system may be able to access the code and/or the difference on behalf of a user of the system by utilizing credentials of the user.

In some implementations, the system may access portions of a log that are close or more related to the error message to determine the context associated with the error. The portions of the log may include information related to the error or the code (e.g., data files or other code pieces associated with the code, information about an application or a service that utilizes the code, or the like). For example, the system may access portions of the log that are adjacent (e.g., immediately above or below) to the error message in the log. The adjacent portions of the log may include a name of a service implemented by the code. The system may execute a regular expression ("regex") search or a semantic search to identify one or more portions of the log that are close or more related to the error message.

To determine the context associated with the error, the system may further search and identify one or more documents associated with the code. The one or more documents may be any information related to the code, the error, and/or the error message, and may include any type of electronic data, such as text, files, documents, books, manuals, emails, images, memorandum, audio, video, metadata, web pages, time series data, and/or any combination of the foregoing and/or the like. For example, a document associated with the code may be a text file that describes a data processing pipeline that is implemented based on the code. The text file may describe various aspects of operations of the data processing pipeline or based on what code pieces the data processing pipeline are implemented. More specifically, the text file may explain how the data processing pipeline converts data from one data type to another data type, list what tools are used by the data processing pipeline during operation, describe types of errors that may occur while executing the data processing pipeline, or the like. As another example, a document associated with the code may describe how a service effected by the code operates, discuss debugging techniques associated with the code, or include comments that explain the code.

The system may utilize various search techniques to identify one or more documents associated with the code. The system may generate one or more search criteria based at least in part on the error message. A search criterion may be that a file name of the code or a keyword (e.g., syntax error, function call) in the error message needs to be at least partially matched in an identified document portion. The system may execute, using at least the one or more search criteria, a similarity search in a set of documents to identify the portions of the one or more documents associated with the code and/or the error. More specifically, the system may extract, clean, and/or chunk the set of documents stored in a database of the system into a plurality of portions/segments of the set of documents. For example, the system may chunk documents into a plurality of words, sentences, paragraphs, and/or the like. The system may further vectorize the plurality of portions of the set of documents to generate a plurality of vectors. Each of the plurality of vectors may correspond to a chunked portion/segment (e.g., a word, a sentence, a paragraph, or the like) of the set of documents. Each vector may be a mathematical representation of semantic content associated with a corresponding chunked portion of the set of documents, thereby enabling the use of semantic search to identify document(s) associated with the code.

In some examples, the system may execute the similarity search using at least one of a language model, an artificial intelligence ("AI") model, a generative model, a machine learning ("ML") model, a neural network ("NN"), or an LLM. In some examples, the similarity search may yield n portions of one or more documents most associated with the code, where n may be any positive integer. Additionally and/or alternatively, the similarity search may yield similar document portions having a threshold similarity with the error message. Depending on the limit on the size of the prompt to the LLM, the system may increase or decrease n. Additionally and/or optionally, rather than executing similarity search based on purely literal matching, the system may effect similarity search based on meanings of portions of a log and portions of one or more documents.

As noted above, the system may also provide citations of one or more documents as parts of the context associated with the error. In some implementations, when the similarity search yields little or no portions of documents associated with the code or the error, the system may generate an alert to a user to indicate occurrence of an unexpected error condition.

Example Features Related to Prompt Generation

Based on the error message and the context associated with the error, the system may generate a prompt that includes the error message and some or all of the aforementioned context associated with the error for a LLM to explain the error message. The prompt may further include instructions that instruct the LLM to generate the explanation of the error message and the suggested fix for the error based on the error message indicating the error and the context associated with the error. For example, the prompt may include instructions to the LLM to provide citations to documents associated with code in an output generated by the LLM so as to enable a user to investigate further, or check the accuracy of the LLM's output. As another example, the prompt may include instructions (e.g., instructing the LLM not to include phone numbers or email addresses in an output, or instructing the LLM should not make up any content in the output if the LLM is uncertain about the correctness of the content) that help the LLM to avoid hallucinations. Additionally and/or optionally, the prompt may include other information useful for analyzing the error, such as ontology associated with a service that utilizes the code, search results from search engines, or the like. Advantageously, by incorporating the error message and relevant context to the prompt, the LLM may effectively and accurately explain the error message and suggest a fix for the error.

Example Features Related to LLM Output and User Interfaces

The system may transmit the prompt to the LLM, and receive an output from the LLM. The output may include an explanation of the error message, and a suggested fix for the error. For example, the output may specify a type of the error (e.g., code build error resulted from a data type exception) and/or elaborate on a cause of the error (e.g., a typo). The output may also provide detailed step(s) for fixing the error (e.g., change a name of an input column, adding a missing function call parameter, modifying and/or replacing a piece or a line of code, or the like). Additionally and/or optionally, the output may specify an entity (e.g., a developer associated with an organization or a service provider) that should be contacted to report or fix the error. The system may further provide the output from the LLM to a user through a user interface. In some implementations, the system may store some data (e.g., prompts to the LLM, outputs from the LLM, and/or errors) to a cache associated with the system. Storing the data to the cache may allow the system to reuse some of the data to improve system efficiency.

Example Features Related to Fixing Error

The system may further implement the suggested fix for the error in response to a user input or some form of user validation (e.g., initiating a pull request that the user would need to confirm), received through the user interface, accepting the suggested fix generate code update. Alternatively and/or optionally, the system may automatically implement the suggested fix using an agent (e.g., artificial intelligence (AI) powered agents).

Further Example Information Related to Various Implementations

To facilitate an understanding of the systems and methods discussed herein, several terms are described below and herein. These terms, as well as other terms used herein, should be construed to include the provided descriptions, the ordinary and customary meanings of the terms, and/or any other implied meaning for the respective terms, wherein such construction is consistent with context of the term. Thus, the descriptions below and herein do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality. LLMs can be useful for natural language processing, including receiving natural language prompts and providing natural language responses based on the text on which the model is trained. LLMs may not be data security- or data permissions-aware, however, because they generally do not retain permissions information associated with the text upon which they are trained. Thus, responses provided by LLMs are typically not limited to any particular permissions-based portion of the model.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

A Prompt (or "Natural Language Prompt" or "Model Input") can be, for example, a term, phrase, question, and/or statement written in a human language (e.g., English, Chinese, Spanish, and/or the like), and/or other text string, that may serve as a starting point for a language model and/or other language processing. A prompt may include only a user input or may be generated based on a user input, such as by a prompt generation module (e.g., of a document search system) that supplements a user input with instructions, examples, and/or information that may improve the effectiveness (e.g., accuracy and/or relevance) of an output from the language model. A prompt may be provided to an LLM which the LLM can use to generate a response (or "model output").

A Context can include, for example, any information associated with user inputs, prompts, responses, and/or the like, that are generated and/or communicated to/from the user, the document search system, the LLM, and/or any other device or system. For example, context may include a conversation history of all of the user inputs, prompts, and responses of a user session. Context may be provided to an LLM to help an LLM understand the meaning of and/or to process a prompt, such as a specific piece of text within a prompt. Context can include information associated with a user, user session, or some other characteristic, which may be stored and/or managed by a context module. Context may include all or part of a conversation history from one or more sessions with the user (e.g., a sequence of user prompts and/or user selections (e.g., via a point and click interface or other graphical user interface). Thus, context may include one or more of: portions of one or more documents associated with code that has a code error, the code, portions of an error log that are close or more related to an error message that indicates the code error, other information that may be relevant to the code error or useful for explaining the error message or suggesting a fix for the code error, previous analyses performed by the system, previous prompts provided by the user, previous conversation of the user with the language model, a role of the user, a context associated with a user input, a user question, or a user query, and/or other contextual information. Additional examples of context are described herein including in reference to, for example, FIG. 2.

A User Operation (or "User Input") can be any operations performed by one or more users to user interface(s) and/or other user input devices associated with a system (e.g., the data extraction system). User operations can include, for example, select, drag, move, group, or the like, nodes or edges of one or more interactive graphical representations for updating an ontology based on unmatched classified triples represented by the nodes or the edges. User operations can also include, for example, selecting an unmatched triple displayed in a list and identify one or more issues associated with the unmatched triple. User operations (e.g., input a text data to the data extraction system) can also prompt a task to be performed, such as by an LLM, in whole or in part.

An Ontology can include stored information that provides a data model for storage of data in one or more databases and/or other data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types. An ontology may be used by an organization to model a view of, or provide a template for, what objects exist in the world, what their properties are, and how they are related to each other.

A Data Store is any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A Database is any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, extensible markup language (XML) files, TEXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like. According to various implementations, any database(s) described in the present disclosure may be replaced by appropriate data store(s). Further, data source(s) of the present disclosure may include one or more databases, one or more tables, one or more data sources, and/or the like, for example.

Example System and Related Computing Environment

FIG. 1A illustrates an example computing environment 100 including an example error analysis system 102 in communication with various devices to respond to a user input or a triggering event, according to various implementations of the present disclosure. The example computing environment 100 includes the error analysis system 102, an LLM 130a, an LLM 130b, a network 140, a data processing service 120, and a user 150 (and/or user computing device). In the example of FIG. 1A, the error analysis system 102 comprises various modules, including a user interface module 104, a context generation module 106, a database module 108, and a prompt generation module 110. In other embodiments, the error analysis system 102 may include fewer or additional components.

In the example of FIG. 1A, the various devices are in communication via a network 140, which may include any combination of networks, such as one or more local area network (LAN), personal area network (PAN), wide area network (WAN), the Internet, and/or any other communication network. In various implementations, modules of the illustrated components, such as the user interface module 104, the context generation module 106, the database module 108, and the prompt generation module 110 of the error analysis system 102, may communicate via an internal bus and/or via the network 140. Additionally, the error analysis system 102 may communicate with one or more LLMs (e.g., the LLM 130a and the LLM 130b) data processing services 120 via the network 140 in the course of fulfilling an objective and/or a user input.

The data processing services 120 may include any quantity of services (or "plug-ins") and any available type of service. For example, the data processing services 120 may include one or more search services (e.g., a table search service, an object search service, a text search service, or any other appropriate search service), indexing services, services for formatting text or visual graphics, services for generating, creating, embedding and/or managing interactive objects in a graphical user interface, services for caching data, services for writing to databases, an ontology traversing service (e.g., for traversing an ontology or performing search-arounds in the ontology to surface linked objects or other data items) or any other services. In some implementations, the data processing services 120 may be a part of the error analysis system 102 (e.g., as part of a data processing services module of the error analysis system 102).

The user interface module 104 is configured to generate user interface data that may be rendered on a user 150, such as to receive an initial user input, as well as later user input that may be used to initiate further data processing. In various implementations, the functionality discussed with reference to the user interface module 104, and/or any other user interface functionality discussed herein, may be performed by a device or service outside of the error analysis system 102 and/or the user interface module 104 may be outside the error analysis system 102. Example user interfaces are described in greater detail below.

In various examples, while implementing an application or a service, the data processing services 120 may generate a log that includes error messages indicating one or more errors in code. Responsive to a request from the user 150 and/or a triggering event, the error analysis system 102 may receive, access, or search the log to identify or determine at least an error message indicating a code error.

The context generation module 106 is configured to determine a context associated with the error indicated by the error message. The context associated with the code error may include the code, portions of the error log that are close or more related to the error message, portions of one or more documents associated with the code, citations of the one or more documents, and/or any other information (e.g., ontology associated with a service that utilizes the code, search results from search engines) that may be relevant to the error or useful for explaining the error message or suggesting a fix for the error. As will be described in greater detail below, the context generation module 106 may employ various search and data processing techniques to identify and obtain the context associated with the error.

The database module 108 is configured to store data that may be accessed by the user 150 and/or various aspects of the error analysis system 102, as described herein. Data that may be stored by the database module 108 may include any type of electronic data, such as error logs, code files, documents, text, data files, books, manuals, emails, images, audio, video, databases, metadata, positional data (e.g., geo-coordinates), sensor data, web pages, time series data, and/or any combination of the foregoing and/or the like. The database module 108 may store the data and/or documents using an ontology, or based on an ontology, which may define document/data types and associated properties, and relationships among documents/data types, properties, and/ or the like. The database module 108 of the error analysis system 102 may obtain and store data and/or information from the data processing services 120 and the user 150.

The prompt generation module 110 is configured to generate one or more prompts to one or more language models, such as LLM 130*a* and/or LLM 130*b*. The prompt generation module 110 may generate a prompt that includes an error message indicating a code error and context associated with the error for the LLM 130*a* and/or LLM 130*b* to explain the error message. The prompt may further include instructions that instruct the LLM 130*a* and/or LLM 130*b* to generate the explanation of the error message and the suggested fix for the error based on the error message indicating the error and the context associated with the error.

As shown in FIG. 1A, the error analysis system 102 may be capable of interfacing with multiple LLMs. This allows for experimentation, hot-swapping and/or adaptation to different models based on specific use cases or requirements, providing versatility and scalability to the system. In various implementations, the error analysis system 102 may interface with a second LLM 130*b* in order to, for example, generate some of context associated with an error for the first LLM 130*a* to explain the error. More specifically, the LLM 130*b* may be utilized by the error analysis system 102 to execute a similarity search to obtain portions of one or more documents associated with code error. Although FIG. 1A illustrates that the LLM 130*a* and the LLM 130*b* are external to the error analysis system 102, in various implementations the LLM 130*a* and/or the LLM 130*b* can be internal to the error analysis system 102.

In some implementations, the error analysis system 102 may receive or access a log (e.g., an error log generated by the data processing services 120) that includes one or more error messages. Each of the one or more error messages may indicate a code error. In response to receiving a user request and/or a triggering event to analyze an error, the error analysis system 102 may search the log to determine an error message that indicates a code error. Based on the log and/or the error message, the context generation module 106 may further search and determine a context associated with the error. The context may include the code, portions of the log that are close or more related to the error message, portions of one or more documents associated with the code, and/or additional information (e.g., ontology associated with a service that utilizes the code, search results from search engines) relevant to the error or useful for one or more LLMs to explain the error message. Additionally, the error analysis system 102 may generate detailed and/or specific instructions for instructing the one or more LLM(s) on operations to perform with respect to the error message and the context associated with the error.

Based on the error message, the context associated with the error, and/or the instructions, the prompt generation module 110 may generate a prompt for an LLM (e.g., the LLM 130*a* and/or the LLM 130*b*). The prompt may include the error message, the context associated with the error, and instructions that guide the LLM to utilize the error message and context to explain the error message. The prompt generation module 110 may transmit the prompt to the LLM, and receive an output from the LLM. The output may include an explanation of the error message, and a suggested fix for the error. Additionally and/or optionally, the error analysis system 102 may provide the output to the user 150 through the user interface module 104 and/or generate a code change based on the output. The error analysis system 102 may fix the error using the code change automatically, or responsive to a user approval received from the user 150 through the user interface module 104.

Example System and Related Modules

Figure 1B:
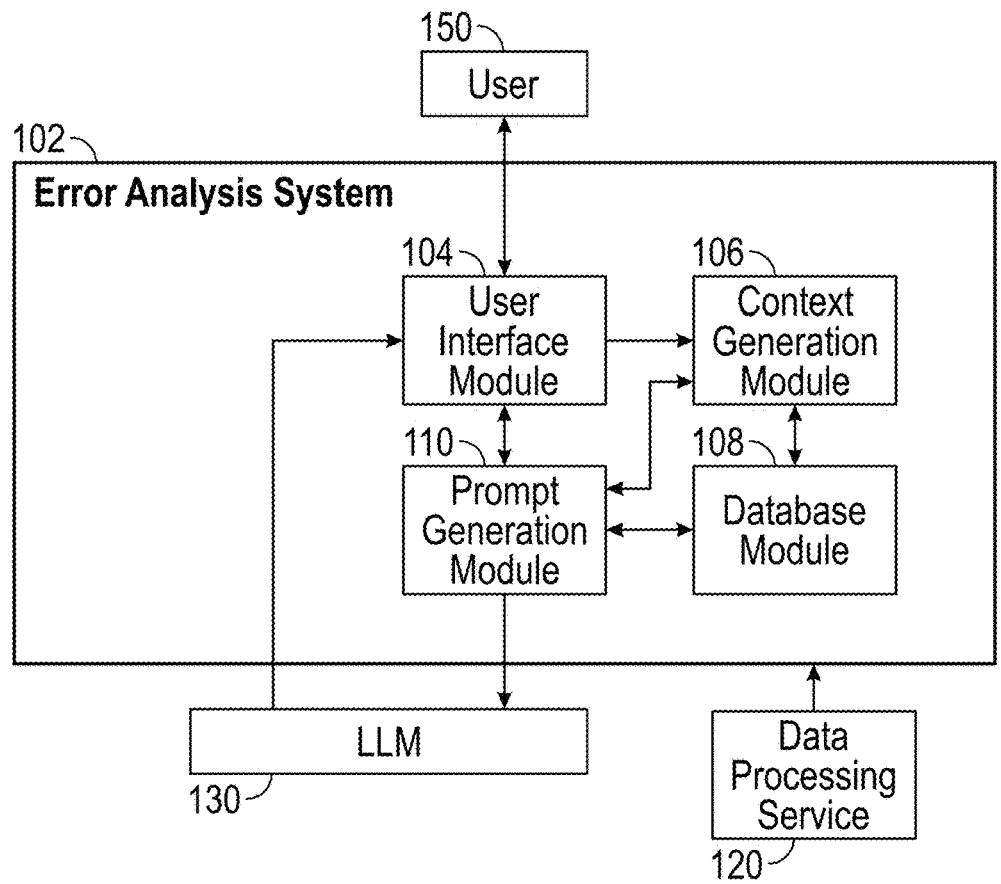
FIG. 1B is a block diagram illustrating the example error analysis system, according to various embodiments of the present disclosure.

FIG. 1B depicts example connections between various modules of the error analysis system 102 of FIG. 1A, including the user interface module 104, the context generation module 106, the database module 108, and the prompt generation module 110. In other embodiments, the error analysis system 102 may include fewer or additional connections. The indicated connections and/or data flows of FIG. 1B are exemplary of only certain processes performed by the error analysis system 102 and is not meant to include all possible blocks and participants.

As described above, the error analysis system 102 may receive or access a log (e.g., from the data processing services 120) that includes error messages indicating one or more errors in code. The log may be generated by the data processing services 120 when implementing an application or a service (e.g., running a data processing pipeline, compiling a software package, or the like). The log may include information related to a code error (also referred to as "an error"), such as an error message that informs the error, a type of the error (e.g., compile time error, run time error, a syntax error, an overflow error, or the like), the name and or file-path of the code associated with the error, timestamps associated with the error, or other information related to the error. The log may further include various information associated with implementations of the application or the service (e.g., code accessed by a service, resources utilized by a service, name or purpose of a service, a user profile of a user requesting the service, various events occurred while providing the service, or the like). In some implementations, the database module 108 may store the log as various types of data files (e.g., text). The log may be large in size (e.g., containing over thousands of lines, or having a file size over several kilobytes or megabytes) and/or include information unrelated to the error. For example, the log may be generated by a compiler while compiling a set of code for effecting a service, and may record various resources and/or information (e.g., libraries, variables, data files, or the like) utilized to build the set of code besides error messages indicating errors (e.g., an improper function call lacking certain parameters) in some of the set of code.

The error analysis system 102 may search the log to identify or determine at least an error message indicating a code error. The error message may include one or more text strings (e.g., "error," "failure," "what went wrong," or the like) that indicate an occurrence of the error. The error message may further indicate a portion of code that is associated with the error, such as specifying that a syntax error occurs at a particular line of code. The error analysis system 102 may perform the search in response to receiving, from the user 150 through the user interface module 104, a user request and/or a triggering event (e.g., upon monitoring that an error log is generated and stored in a particular file repository by the data processing services 120) to analyze the log. In some implementations, the error analysis system 102 may utilize various search techniques to identify or determine the error message from the log. For example, the error analysis system 102 may execute a semantic search based on mathematical representations of portions of the log and/or the error message. As another example, the error analysis system 102 may execute a similarity search based on regular expressions ("regex") associated with the error message.

Based on a log and/or an error message, the context generation module 106 may determine a context associated with the error indicated by the error message. The context associated with the a code error may include the code, portions of the error log that are close or more related to the error message, portions of one or more documents associated with the code, citations of the one or more documents, and/or any other information (e.g., ontology associated with a service that utilizes the code, search results from search engines) that may be relevant to the error or useful for explaining the error message or suggesting a fix for the error. The context generation module 106 may employ various search and data processing techniques to identify and obtain the context associated with the error.

The context generation module 106 may identify and retrieve, based on the error message indicating a code error, at least a portion of the code from a file repository that stores the code. The file repository may be internal (e.g., the database module 108 managed by the error analysis system 102) or external (e.g., managed by another system or a third-party, and/or a database associated with the data processing services 120) to the error analysis system 102. The error message may specify a syntax error in a line of the code along with a file-path or filename of the code. Based on the line, the file-path, and/or the filename of the code, the context generation module 106 may access the code or a portion of the code from a repository that stores the code. Additionally and/or optionally, the context generation module 106 may access the code based on other information in a log that includes the error message. For example, portions of the log that are adjacent to the error message and/or particular parts of the log that can be identified based on a structure of the log may include information indicating which repository or file-path stores the code.

Besides accessing at least a portion of the code, the context generation module 106 may additionally and/or optionally access a difference between multiple versions of at least a section of the code. The difference may record changes made to at least the section of the code across various versions. The context generation module 106 may access the difference using some code management tool or code difference generation command. For example, the context generation module 106 may be able to access the code and/or the difference on behalf of the user 150 by utilizing credentials of the user 150.

In some implementations, the context generation module 106 may access portions of a log that are close or more related to the error message to determine the context associated with the error. The portions of the log may include information related to the error or the code (e.g., data files or other code pieces associated with the code, information about an application or a service that utilizes the code, or the like). For example, the context generation module 106 may access portions of the log that are adjacent (e.g., immediately above or below) to the error message in the log. The adjacent portions of the log may include a name of a service implemented by the code. The context generation module 106 may execute a regular expression ("regex") search or a semantic search to identify one or more portions of the log that are close or more related to the error message.

To determine the context associated with the error, the context generation module 106 may further search and identify one or more documents associated with the code. The one or more documents may be any information related to the code, the error, and/or the error message, and may include any type of electronic data, such as text, files, documents, books, manuals, emails, images, memorandum, audio, video, metadata, web pages, time series data, and/or any combination of the foregoing and/or the like. For example, a document associated with the code may be a text file that describes a data processing pipeline that is implemented based on the code. The text file may describe various aspects of operations of the data processing pipeline or based on what code pieces the data processing pipeline are implemented. More specifically, the text file may explain how the data processing pipeline converts data from one data type to another data type, list what tools are used by the data processing pipeline during operation, describe types of errors that may occur while executing the data processing pipeline, or the like. As another example, a document associated with the code may describe how a service effected by the code operates, discuss debugging techniques associated with the code, or include comments that explain the code.

In some implementations, the context generation module 106 may utilize various search techniques to identify one or more documents associated with the code. The context generation module 106 may generate one or more search criteria based at least in part on the error message. A search criterion may be that a file name of the code or a keyword (e.g., syntax error, function call) in the error message needs to be at least partially matched in an identified document portion. The context generation module 106 may execute, using at least the one or more search criteria, a similarity search in a set of documents to identify the portions of the one or more documents associated with the code. More specifically, the context generation module 106 may extract, clean, and/or chunk the set of documents stored in the database module 108 into a plurality of portions/segments of the set of documents. For example, the context generation module 106 may chunk documents into a plurality of words, sentences, paragraphs, and/or the like. The context generation module 106 may further vectorize the plurality of portions of the set of documents to generate a plurality of vectors. Each of the plurality of vectors may correspond to a chunked portion/segment (e.g., a word, a sentence, a paragraph, or the like) of the set of documents. Each vector may be a mathematical representation of semantic content associated with a corresponding chunked portion of the set of documents, thereby enabling the use of semantic search to identify document(s) associated with the code.

In some implementations, the context generation module 106 may execute the similarity search using at least one of a language model, an artificial intelligence ("AI") model, a generative model, a machine learning ("ML") model, a neural network ("NN"), or an LLM. In some examples, the similarity search may yield n portions of one or more documents most associated with the code, where n may be any positive integer. Additionally and/or alternatively, the similarity search may yield similar document portions having a threshold similarity with the error message. Depending on the limit on the size of the prompt to the LLM, the context generation module 106 may increase or decrease n. Additionally and/or optionally, rather than executing similarity search based on purely literal matching, the context generation module 106 may effect similarity search based on meanings of portions of a log and portions of one or more documents.

In some implementations, the context generation module 106 may also provide citations of one or more documents as parts of the context associated with the error. In some implementations, when the similarity search yields little or no portions of documents associated with the code or the error, the context generation module 106 may generate an alert to the user 150 to indicate occurrence of an unexpected error. In these implementations, the prompt generation module 110 may still generate a prompt based at least on the error message for the LLM. The error message may indicate a typo in the code and the LLM may still be able to explain and/or suggest a fix for the typo without the context associated with the error.

Based on the error message and the context associated with the error, the prompt generation module 110 may generate a prompt that includes the error message and some or all of the aforementioned context associated with the error generated by the context generation module 106 for the LLM 130 (e.g., one of the LLM 130*a* and LLM 130*b* of FIG. 1A) to explain the error message. The prompt may further include instructions that instruct the LLM 130 to generate the explanation of the error message and the suggested fix for the error based on the error message indicating the error and the context associated with the error. For example, the prompt may include instructions to the LLM 130 to provide citations to documents associated with code in an output generated by the LLM 130 so as to enable a user to investigate further, or check the accuracy of the output of the LLM 130. Additionally and/or optionally, the prompt may include other information useful for analyzing the error, such as ontology associated with a service that utilizes the code, search results from search engines, or the like. Advantageously, by incorporating the error message and relevant context to the prompt, the LLM 130 may effectively and accurately explain the error message and suggest a fix for the error.

The prompt generation module 110 may transmit the prompt to the LLM 130. The user interface module 104 may receive an output from the LLM 130. The output may include an explanation of the error message, and a suggested fix for the error. For example, the output may specify a type of the error (e.g., code build error resulted from a data type exception) and/or elaborate on a cause of the error (e.g., a typo). The output may also provide detailed step(s) for fixing the error (e.g., change a name of an input column, adding a missing function call parameter, modifying and/or replacing a piece or a line of code, or the like). Additionally and/or optionally, the output may specify an entity (e.g., a developer associated with an organization or a service provider) that should be contacted to report or fix the error. The user interface module 104 may receive the output from the LLM 130 to present to the user 150.

In some implementations, the error analysis system 102 may further implement the suggested fix for the error in response to a user input, received through the user interface module 104, accepting the suggested fix generate code update. Alternatively and/or optionally, the error analysis system 102 may automatically implement the suggested fix using an agent (e.g., artificial intelligence (AI) powered agents).

Example System and Related Modules

Figure 2:
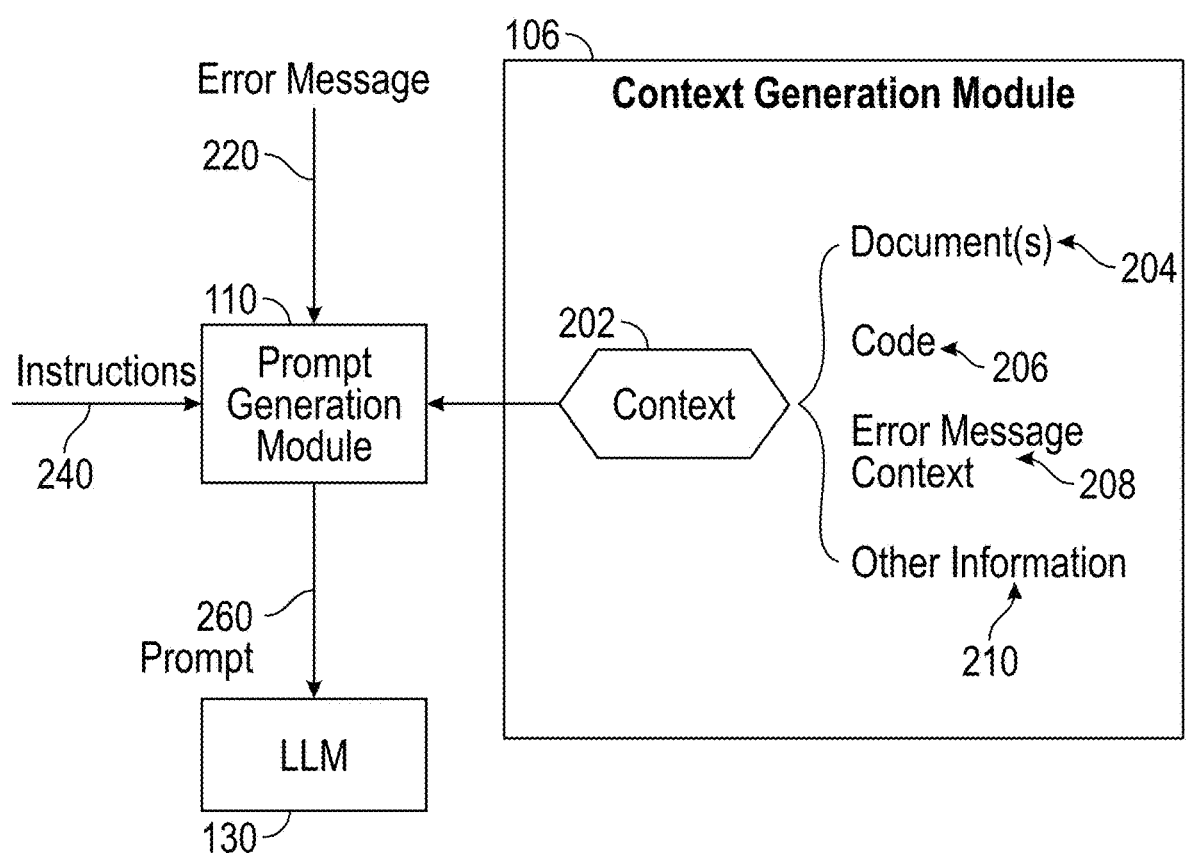
FIG. 2 is a block diagram illustrating example context associated with a code error and example information utilized by the error analysis system to generate a prompt for a large language model ("LLM"), according to various implementations of the present disclosure.

FIG. 2 depicts example context associated with an error generated by the context generation module 106 and example information utilized by the prompt generation module 110 to generate one or more prompts for the LLM 130, according to various implementations of the present disclosure. In the example of FIG. 2, the prompt generation module 110 may generate the prompt 260 for the LLM 130 based on a context 202 that is associated with an error, an error message 220 that indicates the error, and instructions 240. The context generation module 106 may generate the context 202 based on document(s) 204, code 206, error message context 208, and other information 210.

As noted above, the error analysis system 102 may search a log to identify or determine the error message 220 indicating a code error. The error message 220 may include one or more text strings (e.g., "error," "failure," "what went wrong," or the like) that indicate an occurrence of the error. The error message 220 may further indicate a portion of code that is associated with the error, such as specifying that a syntax error occurs at a particular line of code. The error analysis system 102 may perform the search in response to receiving a user request from the user 150 and/or a triggering event (e.g., upon monitoring that an error log is generated and stored in a particular file repository such as the database module 108) to analyze the log. The error analysis system 102 may utilize various search techniques to identify or determine the error message 220 from the log. For example, the error analysis system 102 may execute a semantic search based on mathematical representations of portions of the log and/or the error message 220. As another example, the error analysis system 102 may execute a similarity search based on regular expressions ("regex") associated with the error message 220.

Based on the log and/or the error message 220, the context generation module 106 may determine the context 202 associated with the error indicated by the error message 220. The context 202 associated with the error may include the document(s) 204 (e.g., portions of one or more documents associated with the code), the code 206, the error message context 208 (e.g., portions of the error log that are close or more related to the error message), and/or other information 210 that may be relevant to the error or useful for explaining the error message 220 or suggesting a fix for the error. The context generation module 106 may employ various search and data processing techniques to identify and obtain the context 202 associated with the error. In various implementations, the context 202 can include one or more of the document(s) 204, the code 206, the error message context 208, and/or other information 210. For example, the context 202 can include the document(s) 204 and the code 206. As another example, the context 202 can include the code 206 and other information 210. As still another example, the context 202 may include the documents(s) 204 and the error message context 208.

The document(s) 204 may be any information related to the code, the error, and/or the error message, and may include any type of electronic data, such as text, files, documents, books, manuals, emails, images, memorandum, audio, video, metadata, web pages, time series data, and/or any combination of the foregoing and/or the like. For example, the document 204 associated with the code may be a text file that describes a data processing pipeline that is implemented based on the code. The text file may describe various aspects of operations of the data processing pipeline or based on what code pieces the data processing pipeline are implemented. More specifically, the text file may explain how the data processing pipeline converts data from one data type to another data type, list what tools are used by the data processing pipeline during operation, describe types of errors that may occur while executing the data processing pipeline, or the like. As another example, the document 204 associated with the code may describe how a service effected by the code operates, discuss debugging techniques associated with the code, or include comments that explain the code.

In some implementations, the context generation module 106 may utilize various search techniques to identify the document(s) 204 associated with the code. The context generation module 106 may generate one or more search criteria based at least in part on the error message 220. A search criterion may be that a file name of the code or a keyword (e.g., syntax error, function call) in the error message 220 needs to be at least partially matched in an identified document portion. The context generation module 106 may execute, using at least the one or more search criteria, a similarity search in a set of documents to identify the portions of the document(s) 204 associated with the code. More specifically, the context generation module 106 may extract, clean, and/or chunk the set of documents stored in the database module 108 into a plurality of portions/segments of the set of documents. For example, the context generation module 106 may chunk documents into a plurality of words, sentences, paragraphs, and/or the like. The context generation module 106 may further vectorize the plurality of portions of the set of documents to generate a plurality of vectors. Each of the plurality of vectors may correspond to a chunked portion/segment (e.g., a word, a sentence, a paragraph, or the like) of the set of documents. Each vector may be a mathematical representation of semantic content associated with a corresponding chunked portion of the set of documents, thereby enabling the use of semantic search to identify document(s) 204 associated with the code.

In some examples, the context generation module 106 may execute the similarity search using at least one of a language model, an artificial intelligence ("AI") model, a generative model, a machine learning ("ML") model, a neural network ("NN"), or an LLM that can be different from the LLM 130. In some examples, the similarity search may yield n portions of one or more documents most associated with the code, where n may be any positive integer, such as 10, 20, 30, 40, 50, 60, 70, 80, 90, and 100. Additionally and/or alternatively, the similarity search may yield similar document portions having a threshold similarity with the error message 220. Depending on the limit on the size of the prompt to the LLM 130, the context generation module 106 may increase or decrease n. Additionally and/or optionally, rather than executing similarity search based on purely literal matching, the context generation module 106 may effect similarity search based on meanings of portions of a log and portions of the document(s) 204.

The code 206 may be identified by the context generation module 106 based on the error message 220 that indicates an error in the code 206. The code 206 may be stored in a file repository (not shown in FIG. 2) that may be internal or external to the error analysis system 102. In some implementations, the error message 220 may specify a syntax error in a line of the code 206 along with a file-path or filename of the code 206. Based on the line, the file-path, and/or the filename of the code 206, the context generation module 106 may access the code 206 or a portion of the code 206 from the file repository that stores the code 206.

Additionally and/or optionally, the context generation module 106 may access the code 206 based on other information in the log that includes the error message 220. For example, the error message context 208 (e.g., portions of the log that are adjacent to the error message and/or particular parts of the log that can be identified based on a structure of the log) may include information indicating which repository or file-path stores the code 206.

In some implementations, besides accessing at least a portion of the code 206, the context generation module 106 may additionally and/or optionally access a difference between multiple versions of at least a section of the code 206. The difference may record changes made to at least the section of the code 206 across various versions. The context generation module 106 may access the difference using some code management tool or code difference generation command. For example, the context generation module 106 may be able to access the code 206 and/or the difference on behalf of the user 150 by utilizing credentials of the user 150.

The error message context 208 may include portions of the log that are close or more related to the error message 220. The error message context 208 may include information related to the error or the code 206 (e.g., data files or other code pieces associated with the code 206, information about an application or a service that utilizes the code 206, or the like). For example, the context generation module 106 may access portions of the log that are adjacent (e.g., immediately above or below) to the error message 220 in the log to determine the error message context 208. The error message context 208 of the log may include a name of a service implemented by the code 206. The context generation module 106 may execute a regular expression ("regex") search or a semantic search to identify the error message context 208.

Other information 210 may include any information relevant to the error or useful for explaining the error message 220 or suggesting a fix for the error. For example, other information 210 may include ontology associated with a service that utilizes the code 206. As another example, other information 210 may include search results from search engines that may guide the LLM 130 to more accurately analyze and/or explain the error message 220. As yet another example, other information 210 may include citations of the document(s) 204.

Based on the context 202, the error message 220, and the instructions 240, the prompt generation module 110 may generate the prompt 260 (e.g., a text file) for the LLM 130 to explain the error message 220. The instructions 240 may include any instructions that instruct the LLM 130 to generate the explanation of the error message 220 and the suggested fix for the error based on the error message 220 indicating the error and the context 202 associated with the error. For example, the instructions 240 may instruct the LLM 130 to provide citations to document(s) 204 associated with code 206 in an output generated by the LLM 130 so as to enable the user 150 to investigate further, or check the accuracy of the output from the LLM 130.

Example Functionality and Operations of the System

FIGS. 3, 4A, 4B, and 4C show flowcharts illustrating example operations of the error analysis system 102 (and/or various other aspects of the example computing environment 100), according to various embodiments. The blocks of the flowcharts illustrate example implementations, and in various other implementations various blocks may be rearranged, optional, and/or omitted, and/or additional block may be added. In various embodiments, the example operations of the system illustrated in FIGS. 3, 4A, 4B, and 4C may be implemented, for example, by the one or more aspects of the error analysis system 102, various other aspects of the example computing environment 100, and/or the like.

Figure 3:
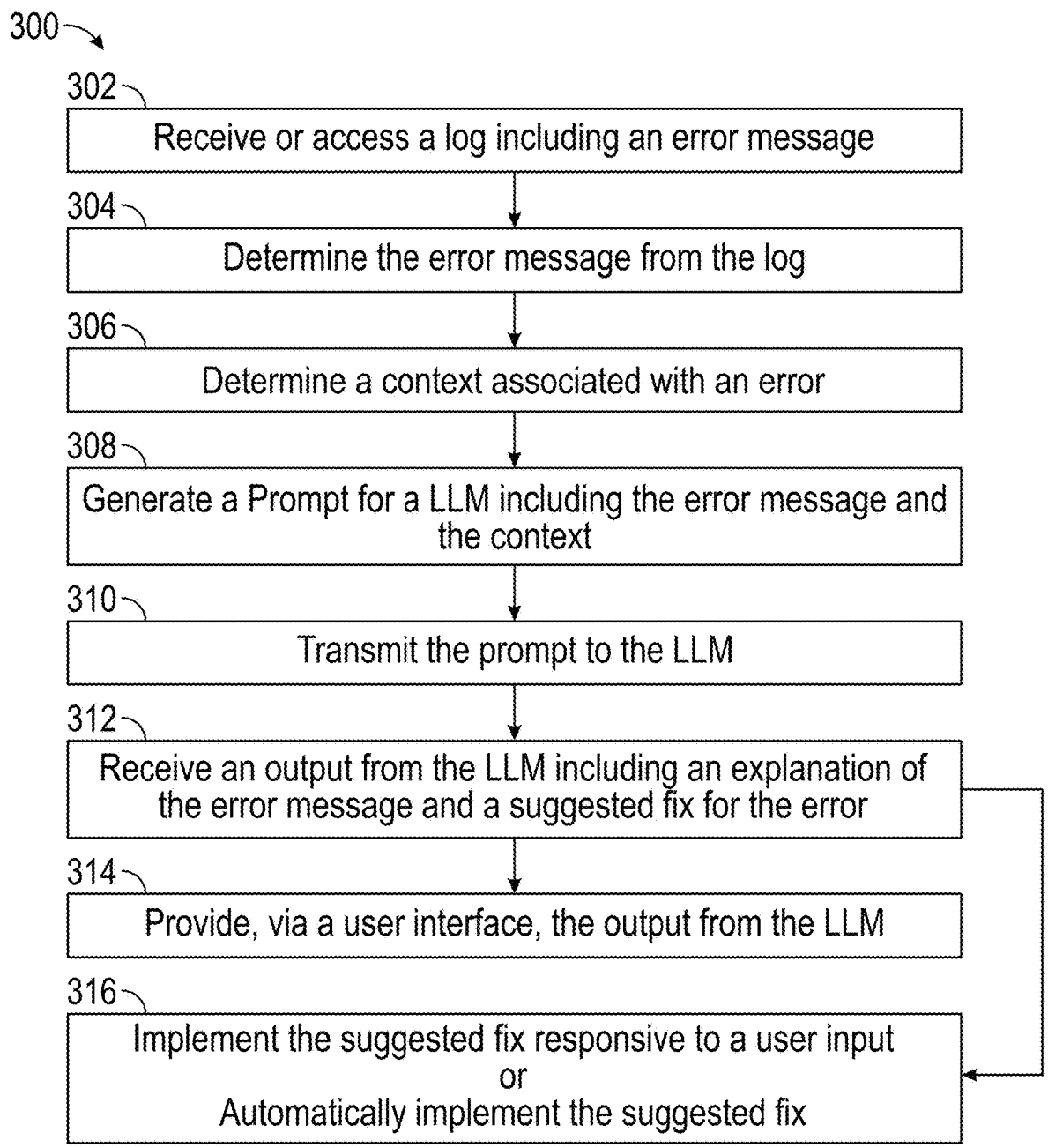
FIG. 3 is a flow chart illustrating an example routine for utilizing an LLM to explain a code error and suggest a fix for the code error, according to various embodiments of the present disclosure.

FIG. 3 depicts a flowchart illustrating an example method 300 according to various embodiments. The method 300 may be implemented, for example, by the error analysis system 102 of FIGS. 1A and 1B to explain and/or fix code errors, utilizing one or more LLMs (e.g., LLM 130*a*, 130*b*, 130), based on context more associated with the code errors.

At block 302, the error analysis system 102 may receive or access a log that includes an error message. For example, the log may be generated by the data processing services 120 when implementing an application or a service (e.g., running a data processing pipeline, compiling a software package, or the like). The log may include information related to a code error, such as an error message that informs the error, a type of the error (e.g., compile time error, run time error, a syntax error, an overflow error, or the like), the name and or file-path of the code associated with the error, timestamps associated with the error, or other information related to the error. The log may further include various information associated with implementations of the application or the service (e.g., code accessed by a service, resources utilized by a service, name or purpose of a service, a user profile of a user requesting the service, various events occurred while providing the service, or the like). The log may be stored as various types of data files (e.g., text) in a database (e.g., the database module 108) or storage accessible to the error analysis system 102. The log may be large in size (e.g., containing over thousands of lines, or having a file size over several kilobytes or megabytes) and/or include information unrelated to the error. An example log that includes error message(s) will be illustrated below in FIG. 5.

At block 304, the error analysis system 102 may determine the error message from the log. For example, the error analysis system 102 may search the log received at block 302 to determine the error message 220 of FIG. 2. The error message 220 may include one or more text strings (e.g., "error," "failure," "what went wrong," or the like) that indicate an occurrence of the error. The error message 220 may further indicate a portion of code that is associated with the error, such as specifying that a syntax error occurs at a particular line of code. To determine the error message 220, the error analysis system 102 may perform the search in response to receiving a user request from the user 150 and/or a triggering event (e.g., upon monitoring that the log is generated and stored by the data processing services 120 in a particular file repository) to analyze the log. The error analysis system 102 may utilize various search techniques to identify or determine the error message 220 from the log. For example, the error analysis system 102 may execute a semantic search based on mathematical representations of portions of the log and/or the error message 220. As another example, the error analysis system 102 may execute a similarity search based on regular expressions ("regex") associated with the error message 220.

At block 306, the error analysis system 102 may determine a context associated with an error indicated by the error message determined at block 304. For example, the context generation module 106 may determine the context 202 associated with the error indicated by the error message 220. The context 202 associated with the error may include the document(s) 204 (e.g., portions of one or more documents associated with the code), the code 206, the error message context 208 (e.g., portions of the error log that are close or more related to the error message), and other information 210 that may be relevant to the error or useful for explaining the error message 220 or suggesting a fix for the error. The context generation module 106 may employ various search and data processing techniques, as described above with respect to FIG. 2, to identify and obtain the context 202 associated with the error. For example, the context generation module 106 may employ an LLM to execute a similarity search to determine portions of the document(s) 204 associated with the code.

At block 308, the error analysis system 102 may generate a prompt for a LLM including the error message and the context. For example, the prompt generation module 110 may generate the prompt 260 (e.g., a text file) for the LLM 130 to explain the error message 220. The prompt 260 may include the document(s) 204, the code 206, the error message context 208, and other information 210 to guide the LLM 130 for explaining the error message 220. For example, other information 210 may be any information useful for analyzing the error, such as ontology associated with a service that utilizes the code, search results from search engines responsive to a search request submitted by the error analysis system 102, or the like. The prompt 260 may further include the instructions 240 that instruct the LLM 130 to generate the explanation of the error message 220 and the suggested fix for the error based on the error message 220 indicating the error and the context 202 associated with the error. For example, the instructions 240 may instruct the LLM 130 to provide citations to the document(s) 204 associated with code 206 in an output generated by the LLM 130 so as to enable the user 150 to investigate further, or check the accuracy of the output from the LLM 130. An example prompt and instructions included in the example prompt for a LLM will be described with in FIG. 6.

At block 310, the error analysis system 102 may transmit the prompt to the LLM. For example, the prompt generation module 110 may transmit the prompt 260 to the LLM 130 for the LLM 130 to explain the error message and/or suggest a fix for the error. In some implementations, the LLM 130 may be the same or different from an LLM employed by the context generation module 106, at block 306, to execute a similarity search to determine portions of the document(s) 204 associated with the code.

At block 312, the error analysis system 102 may receive an output from the LLM, the output including an explanation of the error message and a suggested fix for the error. For example, the user interface module 104 may receive the output from the LLM 130. The output may include an explanation of the error message 220, and a suggested fix for the error. For example, the output may specify a type of the error (e.g., code build error resulted from a data type exception) and/or elaborate on a cause of the error (e.g., a typo). The output may also provide detailed step(s) for fixing the error (e.g., change a name of an input column, adding a missing function call parameter, modifying and/or replacing a piece or a line of code, or the like). Additionally and/or optionally, the output may specify an entity (e.g., a developer associated with an organization or a service provider) that should be contacted to report or fix the error.

The method 300 may further optionally proceed to block 314. At block 314, the error analysis system 102 may provide the output from the LLM via a user interface. For example, the error analysis system 102 may provide the output from the LLM via the user interface module 104 to the user 150. Example outputs from the LLM provided via a user interface will be described in FIGS. 7-8.

The method 300 may further optionally proceed to block 316. At block 316, the error analysis system 102 may implement the suggested fix for the error responsive to a user input, or automatically implement the suggested fix. For example, the error analysis system 102 may implement the suggested fix in the output in response to a user input from the user 150, received through the user interface module 104, accepting the suggested fix generate code update. As another example, the error analysis system 102 may automatically implement the suggested fix using an agent (e.g., artificial intelligence (AI) powered agents).

FIG. 4A is a flowchart illustrating an example implementation of the block 306 for determining the context associated with a code error, according to various embodiments of the present disclosure. In various implementations, the example implementation includes blocks 402, 404, 406, 408, and 410 that may be performed in part or in full by the error analysis system 102, such as the context generation module 106, to generate the context 202 associated with the error. In various implementations, some of the blocks 402, 404, 406, 408, and 410 may be performed by the context generation module 106 concurrently and/or sequentially.

In various implementations, blocks 402 and 404 may be performed by the context generation module 106 to generate the document(s) 204; block 406 may be performed by the context generation module 106 to generate the code 206; block 408 may be performed by the context generation module 106 to generate the error message context 208; and block 410 may be performed by the context generation module 106 to generate other information 210.

At block 402, the context generation module 106 may generate one or more search criteria. For example, the context generation module 106 may generate the one or more search criteria based at least in part on the error message 220. A search criterion may be that a file name of the code 206 or a keyword (e.g., syntax error, function call) in the error message 220 needs to be at least partially matched in an identified document portion.

At block 404, the context generation module 106 may execute, using at least the one or more search criteria, a similarity search in a set of documents to identify portions of one or more documents associated with the code and/or the error. In some implementations, the similarity search may be executed in a document search model that may be generated by chunking and vectorizing document portions. The generation of the document search model will be described in FIG. 4C.

In some implementations, the context generation module 106 may extract, clean, and/or chunk the set of documents stored in the database module 108 into a plurality of portions/segments of the set of documents. More specifically, the context generation module 106 may chunk documents into a plurality of words, sentences, paragraphs, and/or the like. The context generation module 106 may further vectorize the plurality of portions of the set of documents to generate a plurality of vectors. Each of the plurality of vectors may correspond to a chunked portion/segment (e.g., a word, a sentence, a paragraph, or the like) of the set of documents. Each vector may be a mathematical representation of semantic content associated with a corresponding chunked portion of the set of documents, thereby enabling the use of semantic search to identify document(s) 204 associated with the code 206.

At block 406, the context generation module 106 may determine a portion of the code associated with the error. For example, the context generation module 106 may identify and retrieve, based on the error message 220 indicating the error in code 206, at least a portion of the code 206 from a file repository that stores the code 206. The error message 220 may specify a syntax error in a line of the code 206 along with a file-path or filename of the code 206. Based on the line, the file-path, and/or the filename of the code 206, the context generation module 106 may access the code 206 or a portion of the code 206 from a repository that stores the code 206. Additionally and/or optionally, the context generation module 106 may access the code based on other information in a log that includes the error message. For example, portions of the log that are adjacent to the error message 220 and/or particular parts of the log that can be identified based on a structure of the log may include information indicating which repository or file-path stores the code 206. Besides accessing at least a portion of the code 206, the context generation module 106 may additionally and/or optionally access a difference between multiple versions of at least a section of the code 206. The difference may record changes made to at least the section of the code 206 across various versions.

At block 408, the context generation module 106 may determine portions of the log that are adjacent (e.g., immediately above or below) to the error message. For example, the context generation module 106 may access portions of a log that are close or more related to the error message 220. The portions of the log may include information related to the error or the code 206 (e.g., data files or other code pieces associated with the code, information about an application or a service that utilizes the code, or the like). The adjacent portions of the log may include a name of a service implemented by the code 206. The context generation module 106 may execute a regular expression ("regex") search or a semantic search to identify one or more portions of the log that are close or more related to the error message 220.

At block 410, the context generation module 106 may determine other context associated with the error. In various implementations, other context may include any information relevant to the error or useful for explaining the error message 220 or suggesting a fix for the error. For example, other context may include ontology associated with a service that utilizes the code 206. As another example, other context may include search results from search engines that may guide the LLM 130 to more accurately analyze and/or explain the error message 220. As yet another example, other context may include citations of the document(s) 204 associated with the code 206. As still another example, other context may include information about an environment under which the code is executed. The environment may include some or all libraries (e.g., specific to a Python version for running a Python code) the code relies on for execution. Advantageously, including information about the environment may help the LLM to explain and/or fix the error when, for example, the error is caused by installed libraries associated with the environment.

FIG. 4B is a flowchart illustrating an example implementation (e.g., block 404A) of the block 404 for executing a similarity search in the set of documents to identify the portions of the one or more documents associated with the code. In various implementations, the example implementation of block 404 may be performed at least in part by the context generation module 106 and an LLM.

At block 404A, the context generation module 106 may execute the similarity search using an LLM to identify the portions of the one or more documents associated with the code and/or the error. In some examples, the similarity search may yield n portions of one or more documents most associated with the code, where n may be any positive integer. Additionally and/or alternatively, the similarity search may yield similar document portions having a threshold similarity with the error message. Depending on the limit on the size of the prompt to the LLM, the system may increase or decrease n. Additionally and/or optionally, rather than executing similarity search based on purely literal matching, the system may effect similarity search based on meanings of portions of a log and portions of one or more documents.

In some implementations, the error analysis system 102 may utilize the same LLM to execute the similarity search at block 404A and generate the output received at block 312. For example, the error analysis system 102 may utilize the LLM 130, or one of the LLM 130a and LLM 130b, to execute the similarity search and generate the output. In other implementations, the error analysis system 102 may utilize different LLMs to execute the similarity search at block 404A and generate the output received at block 312. For example, the error analysis system 102 may utilize the LLM 130a to execute the similarity search, and utilize the LLM 130b to generate the output received at block 312.

FIG. 4C is a flowchart illustrating an example method 450 for generating a document search model that may be utilized to execute the similarity search at block 404. The method 450 may be implemented, for example, by the context generation module 106 of FIGS. 1A and 1B to generate the document search model.

At block 452, the context generation module 106 may chunk the set of documents into a plurality of portions of the set of documents. For example, the context generation module 106 may chunk the set of documents into a plurality of words, sentences, paragraphs, and/or the like.

At block 454, the context generation module 106 may further vectorize the plurality of portions of the set of documents to generate a plurality of vectors. Each of the plurality of vectors may correspond to a chunked portion/segment (e.g., a word, a sentence, a paragraph, or the like) of the set of documents. Each vector may be a mathematical representation of semantic content associated with a corresponding chunked portion of the set of documents, thereby enabling the use of semantic search to identify document(s) associated with code.

Example User Interfaces and Related Functionality

FIG. 5 shows an example user interface 500 including an example log 510, such as the log received at block 302, according to various implementations of the present disclosure. In various implementations, the example log 510 may be received and analyzed by the error analysis system 102 of FIGS. 1A and 1B for explaining a code error and/or suggesting a fix for the code error.

As shown in FIG. 5, the user interface 500 may include a message portion 502 and the log 510. The message portion 502 indicates a time when the log 510 is generated. Here, the message portion 502 includes "YYYY-MM-DD tt: tt" to suggest the time the log 510 is generated. The log 510 shows various message portions, such as the message portion 512, the message portion 514, the message portion 516, and the message portion 518. In some implementations, the log 510 may be generated by the data processing services 120 of FIGS. 1A and 1B while providing an application or a service (e.g., running a data processing pipeline, compiling a software package, or the like). The log 510 may be stored as a text file in the database module 108 by the error analysis system 102. It should be noted that the log 510 may include more information and may be longer than what is illustrated in FIG. 5.

As illustrated in FIG. 5, the message portion 512, the message portion 514 and the message portion 518 may be error messages (the same or similar to the error message 220) that indicate to the user 150 error(s) in code. Here, the message portion 512 states "FAILURE: Build failed with an exception." The message portion 514 reads "What went wrong: Execution failed for task 'Task name 4'. Execution failed with non-zero exit code: 1." The message portion 518 states "SyntaxError: invalid syntax" to suggest that line 2471 of code in the path "Filepath 5/Filename 5" has a syntax error. Based on the message portion 518 that includes the path (e.g., "Filepath 5/Filename 5") of the code, the error analysis system 102 may identify the code that is associated with the syntax error.

In some implementations, responsive to receiving a user request and/or a triggering event (e.g., upon monitoring that the log 510 is generated and stored in a particular file repository), the error analysis system 102 may search the log 510 (e.g., a text file) to determine one or more error messages, such as the message portion 512, the message portion 514, or the message portion 518. For example, the error analysis system 102 may execute a semantic search based on mathematical representations of portions of the log 510 and/or the message portions 512, 514 and 518. As another example, the error analysis system 102 may execute a similarity search based on regular expressions ("regex") associated with the message portions 512, 514 and 518.

As show in FIG. 5, the log 510 further includes the message portion 516 that may provide some context (the same or similar to the error message context 208) to an error message (e.g., the message portion 518) in the log 510. The message portion 516 may be close or more related to one or more error messages (e.g., the message portion 512, the message portion 514, and the message portion 518) in the log 510. Here, the message portion 516 states "Traceback (most recent call last):" and is followed by various filepaths and filenames (e.g., the Filepath 1/Filename 1, the Filepath 2/Filename 2, the Filepath 3/Filename 3, the Filepath 4/Filename 4, and the Filepath 5/Filename 5). In some implementations, the error analysis system 102 may access portions of the log 510 that are adjacent (e.g., immediately above or below) to an error message (e.g., the message portion 518) in the log 510. The error analysis system 102 may execute a regular expression ("regex") search or a semantic search to identify one or more portions of the log 510 that are close or more related to the error message.

FIG. 6 shows an example prompt 600 for a LLM to explain an error message indicating a code error, according to various implementations of the present disclosure. In various implementations, the example prompt 600 may be generated by the error analysis system 102 (e.g., the prompt generation module 110) of FIG. 1A or 1B and transmitted by the error analysis system 102 to an LLM (e.g., the LLM 130, the LLM 130a, or the LLM 130b) for explaining the error message indicating the error. In some implementations, the prompt 600 may be a text file generated by the prompt generation module 110 to include the instructions 240, the error message 220, and the context 202.

As illustrated in FIG. 6, the prompt 600 includes the portion 602, the portion 604, the portion 606, the portion 608, and the portion 610. The portion 602 may provide instructions (the same or similar to the instructions 240) to an LLM for using the portions 604, 606, 608, and 610 to more accurately and efficiently explain a code error. Here, the portion 602 provides detailed instructions to the LLM. Parts of the portion 602 state "You are Error Assist that follows the rules: Using the given information about a failing job {{jobType}}, write a short summary of why it failed, followed by a suggestion of how to fix it. If unsure of the cause of the failure, or how to fix it, suggest the user consults with system support rather than try to give a fix suggestion."

The portion 610 includes an error message (e.g., the error message 220) indicating a code error. For example, the portion 610 may include the message portion 518 that indicates a code error. Here, the portion 610 reads "Error: {{error message}}."

The portion 604 includes portions of one or more documents (e.g., the document(s) 204) associated with the code. Here, the portion 604 states "{{documents}}." As noted above, the portion 604 may include any information related to the code, the error, and/or the error message, and may include any type of electronic data, such as text, files, documents, books, manuals, emails, images, memorandum, audio, video, metadata, web pages, time series data, and/or any combination of the foregoing and/or the like.

The portion 606 includes at least a portion of code (e.g., the code 206) that has the error. Besides including at least the portion of code, the portion 606 may include difference between multiple versions of at least a section of the code. Here, the portion 606 shows "{{code}}."

The portion 608 includes context to the error message included in the portion 610. For example, the portion 608 may include the message portion 516 that are close or more related to one or more error messages in the log 510. As another example, the portion 608 may include the error message context 208. Here, the portion 608 states "{{error message context}}." In some implementations, based on the prompt 600 that includes the portion 602, 604, 606, 608 and 610, an LLM (e.g., the LLM 130, the LLM 130a, or the LLM 130b) may generate an output that will be illustrated in FIG. 7 or 8.

Figure 7:
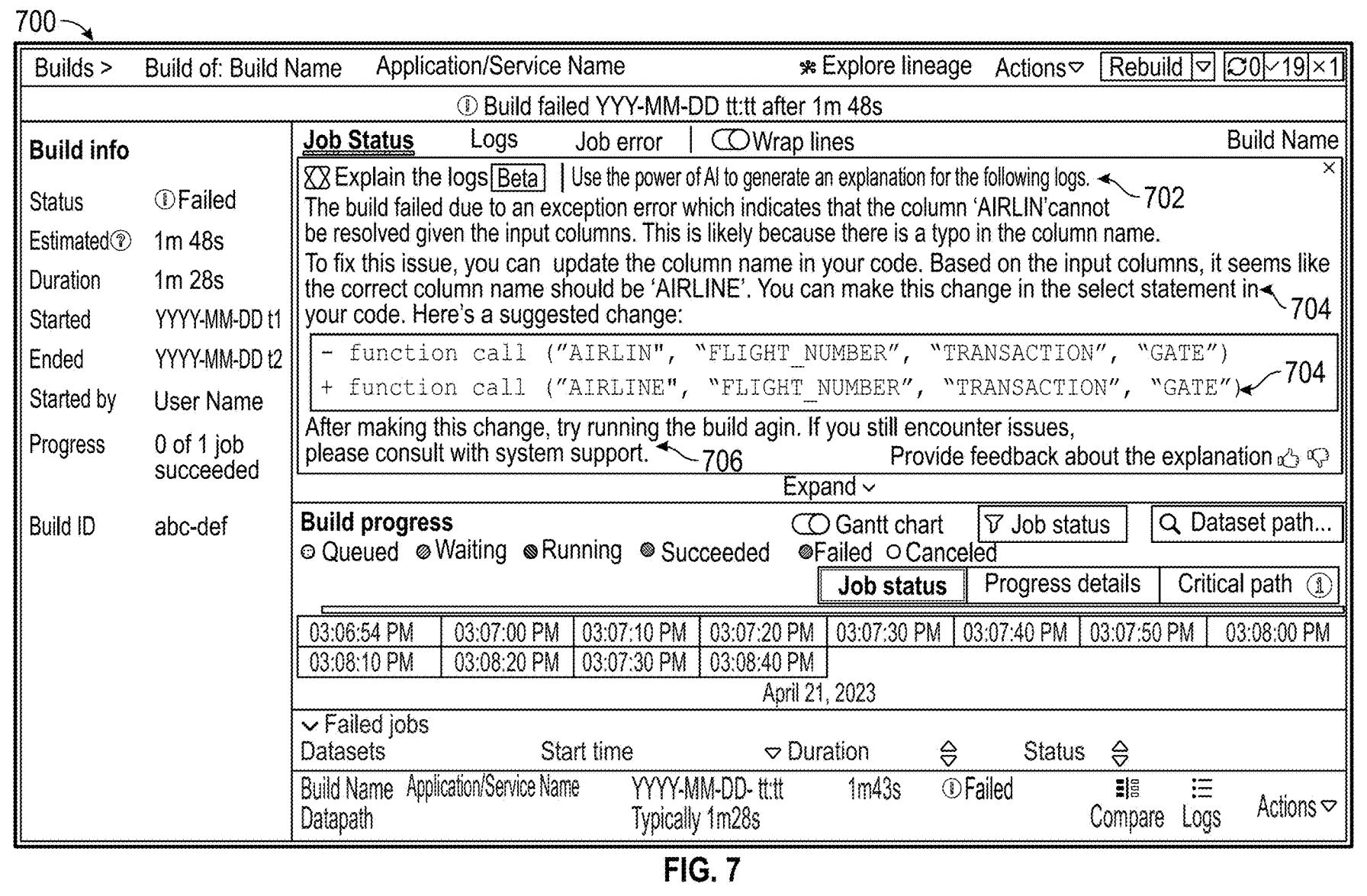

FIGS. 7-8 show example user interfaces that illustrates outputs received by the error analysis system 102 of FIG. 1A or 1B from an LLM (e.g., the LLM 130, the LLM 130a, or the LLM 130b) for explaining errors in code, according to various implementations of the present disclosure. In various implementations, the example user interfaces may be presented through the user interface module 104 of the error analysis system 102 to the user 150, or a user interface of the user 150. The example user interfaces may allow the user 150 to better understand errors in code and fix the errors.

As shown in FIG. 7, the user interface 700 may include a message portion 702 that explains an error message indicating a code error (e.g., the error message 220 that indicates an error in the code 206, or the portion 518 that indicates a code error). Specifically, the message portion 702 may explain with detail the error message. Here, the message portion 702 reads "The build failed due to an exception error, which indicates that the column 'AIRLIN' cannot be resolved given the input columns. This is likely because there is a typo in the column name."

The user interface 700 may further include a message portion 704 that provides a suggested fix for the error to the user 150. Here, parts of the message portion 704 state "To fix this issue, you can update the column name in your code. Based on the input columns, it seems like the correct column name should be 'AIRLINE'. You can make this change in the select statement in your code. Here's a suggested change:" followed by the suggested change that suggests the user 150 to replace "function call ("AIRLIN", "FLIGHT_NUMBER", "TRANSACTION", "GATE")" with "function call ("AIRLINE", "FLIGHT_NUMBER", "TRANSACTION", "GATE")."

Besides explaining the error and suggesting a fix for the error, the user interface 700 may further include the portion 706 that suggests other actions the user 150 may take. Here, the portion 706 reads "After making this change, try running the build again. If you still encounter issues, please contact with system support."

As shown in FIG. 8, the user interface 800 may include a message portion 802, a message portion 804, and a message portion 806. The message portion 802 explains an error message indicating a code error (e.g., the error message 220 that indicates an error in the code 206, or the portion 518 that indicates a code error). Specifically, the message portion 802 may explain with detail the error message. Here, the message portion 802 reads "The check failed due to a syntax error in your code. The error is in the file Code filename at line 37. It seems that the def keyword is missing the function name and its parameters."

The user interface 800 may further include the message portion 804 that provides a suggested fix for the error to the user 150. Here, parts of the message portion 804 state "To fix this issue, you should complete the function definition by adding the function name and its parameters. For example, if you intended to define a function called my_function with a single parameter x, you should update line 37 like this:" followed by the suggested change that suggests the user 150 to replace "def" with "def my_function (x)."

Besides explaining the error and suggesting a fix for the error, the user interface 800 may further include the portion 806 that suggests other actions the user 150 may take. Here, the portion 806 reads "After making this change, you can try running the check again. If you still encounter issues, please contact with system support."

Additional Example Implementations and Details

In an implementation of the system (e.g., one or more aspects of the error analysis system 102, one or more aspects of the computing environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 9) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In various implementations the virtual computing environment may comprise one or more virtual machines, containers, and/or other types of emulations of computing systems or environments. In various implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In various alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in various implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, Vx Works, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
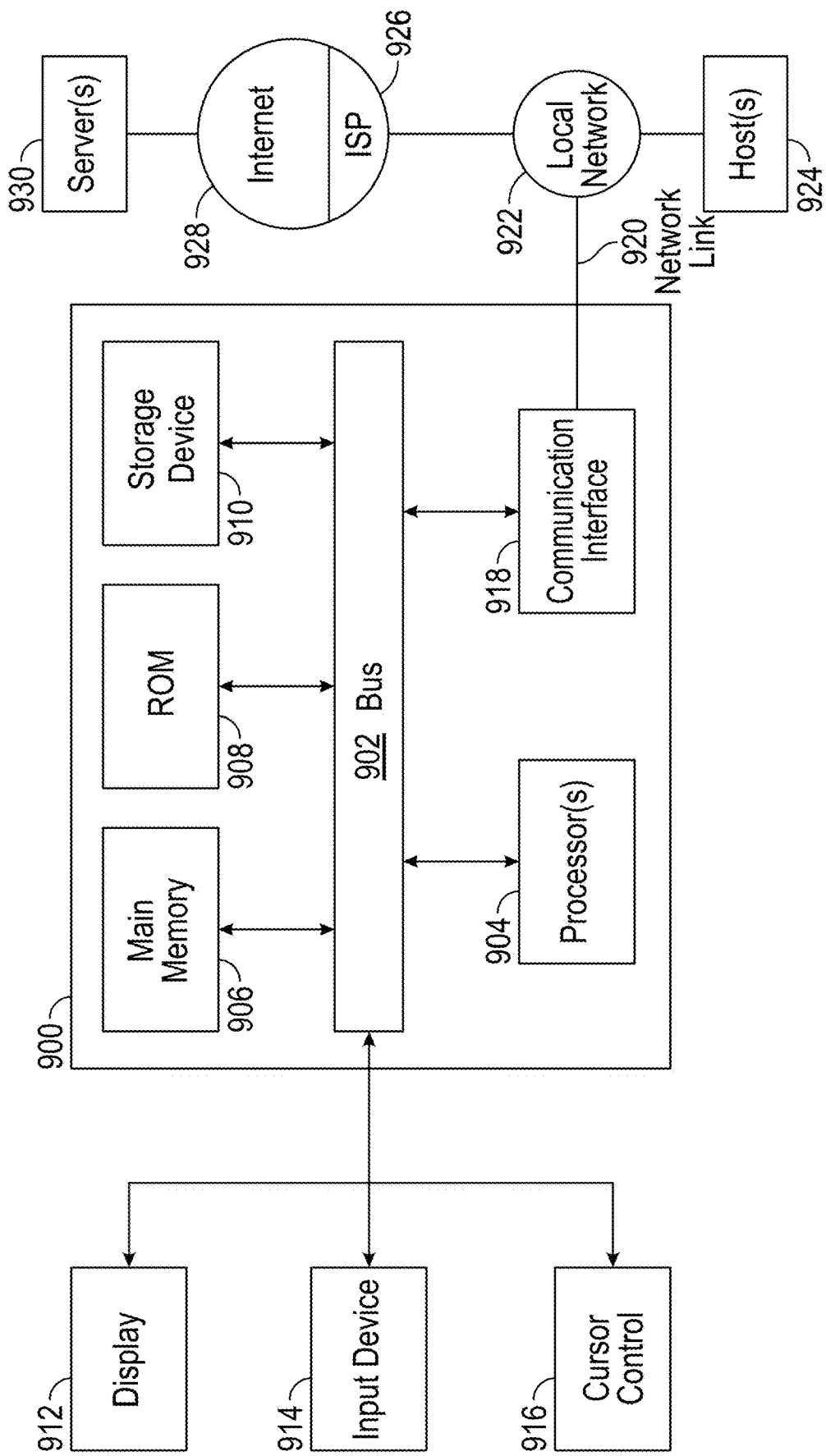
FIG. 9 is a block diagram of an example computer system consistent with various implementations of the present disclosure.

For example, FIG. 9 shows a block diagram that illustrates a computer system 900 upon which various implementations and/or aspects (e.g., one or more aspects of the computing environment 100, one or more aspects of the error analysis system 102, one or more aspects of the user 150, one or more aspects of the data processing service 120, one or more aspects of the LLMs 130*a* and 130*b*, and/or the like) may be implemented. Multiple such computer systems 900 may be used in various implementations of the present disclosure. Computer system 900 includes a bus 902 or other communication mechanism for communicating information, and a hardware processor, or multiple processors, 1604 coupled with bus 902 for processing information. Hardware processor(s) 904 may be, for example, one or more general purpose microprocessors.

Computer system 900 also includes a main memory 906, such as a random-access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. The main memory 906 may, for example, include instructions to implement server instances, queuing modules, memory queues, storage queues, user interfaces, and/or other aspects of functionality of the present disclosure, according to various implementations.

Computer system 900 further includes a read only memory (ROM) 1608 or other static storage device coupled to bus 902 for storing static information and instructions for processor 904. A storage device 910, such as a magnetic disk, optical disk, or USB thumb drive (Flash drive), and/or the like, is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In various implementations, the same direction information and command selections as cursor control may be implemented via receiving touches on a touch screen without a cursor.

Computer system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one implementation, the techniques herein are performed by computer system 900 in response to processor(s) 904 executing one or more sequences of one or more computer-readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 1626. ISP 926 in turn provides data communication services through the worldwide packet data communication network now commonly referred to as the "Internet" 1628. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computerized method, performed by a computing system having one or more hardware computer processors and one or more non-transitory computer-readable storage devices storing software instructions executable by the computing system, the computerized method comprising: receiving or accessing a log comprising an error message, the error message indicating an error in code; determining the error message from the log; determining a context associated with the error; generating a prompt for a large language model ("LLM"), the prompt comprising at least: the error message, and the context associated with the error; transmitting the prompt to the LLM; and receiving an output from the LLM in response to the prompt, the output comprising at least: an explanation of the error message, and a suggested fix for the error.

Clause 2. The computerized method of Clause 1, wherein the error is at least one of: a compile time error of the code or a run time error of the code.

Clause 3. The computerized method of any of Clauses 1-2, wherein determining the error message from the log comprises: executing a semantic search or a regular expression ("regex") search on the log to identify the error message, wherein the error message comprises one or more text strings.

Clause 4. The computerized method of any of Clauses 3, wherein the one or more text strings comprises at least one of: a natural language word, a natural language phrase, or a natural language sentence that indicates an occurrence of the error.

Clause 5. The computerized method of any of Clauses 1-4, wherein the context associated with the error comprises portions of one or more documents associated with the code.

Clause 6. The computerized method of claim 5, wherein determining the context associated with the error comprises: generating, based at least in part on the error message, one or more search criteria; and executing, using at least the one or more search criteria, a similarity search in a set of documents to identify the portions of the one or more documents associated with the code.

Clause 7. The computerized method of claim 6, wherein the similarity search comprises execution of a document search model, and wherein the computerized method further comprising: generating the document search model, wherein generating the document search model comprises: chunking the set of documents into a plurality of portions of the set of documents; and vectorizing the plurality of portions of the set of documents to generate a plurality of vectors.

Clause 8. The computerized method of any of Clauses 6-7, wherein executing the similarity search comprises using at least one of: a language model, an artificial intelligence ("AI") model, a generative model, a machine learning ("ML") model, a neural network ("NN"), or another LLM.

Clause 9. The computerized method of any of Clauses 5-8, wherein the portions of the one or more documents associated with the code comprise a quantity n portions of the one or more documents most associated with the code.

Clause 10. The computerized method of any of Clauses 5-9, wherein the portions of the one or more documents associated with the code comprise document portions having a threshold similarity with the error message.

Clause 11. The computerized method of any of Clauses 5-10, wherein the context associated with the error comprises one or more citations to the one or more documents.

Clause 12. The computerized method of any of Clauses 1-11, wherein the context associated with the error comprises extended portions of the log that are adjacent to the error message in the log.

Clause 13. The computerized method of any of Clauses 1-12, wherein the context associated with the error comprises a portion of the code associated with the error.

Clause 14. The computerized method of claim 13, wherein determining the context associated with the error comprises: accessing the code from a repository that stores the code; and identifying, based on the error message, the portion of the code associated with the error.

Clause 15. The computerized method of any of Clauses 13-14, wherein the portion of the code associated with the error comprises a difference between multiple versions of at least a section of the code.

Clause 16. The computerized method of any of Clauses 1-15, wherein the prompt further comprises at least: one or more instructions that instruct the LLM to generate the explanation of the error message and/or the suggested fix for the error based on the error message and the context associated with the error.

Clause 17. The computerized method of any of Clauses 1-16 further comprising: providing, via a user interface, the output from the LLM.

Clause 18. The computerized method of any of Clauses 1-17 further comprising at least one of: implementing the suggested fix in response to a user input accepting the suggested fix, or automatically implementing the suggested fix.

Clause 19. The computerized method of any of Clauses 1-18, wherein the suggested fix comprises a modification to at least a section of the code.

Clause 20. A system comprising: one or more computer-readable storage mediums having program instructions embodied therewith; and one or more processors configured to execute the program instructions to cause the system to perform the computerized method of any of Clauses 1-19.

Clause 21. A computer program product comprising one or more computer-readable storage mediums having program instructions embodied therewith, the program instructions executable by one or more processors to cause the one or more processors to perform the computerized method of any of Clauses 1-19.

What is claimed is:

1. A computerized method, performed by a computing system having one or more hardware computer processors and one or more non-transitory computer-readable storage devices storing software instructions executable by the computing system, the computerized method comprising:
   receiving or accessing a log comprising an error message, the error message indicating an error in code;
   determining the error message from the log;
   determining a context associated with the error, wherein the context associated with the error comprises portions of one or more documents associated with the code, and wherein the portions of the one or more documents associated with the code comprise document portions having a threshold similarity with the error message;
   generating a prompt for a large language model ("LLM"), the prompt comprising at least: the error message, and the context associated with the error;
   transmitting the prompt to the LLM;
   receiving an output from the LLM in response to the prompt, the output comprising at least: an explanation of the error message, and a suggested fix for the error; and
   implementing the suggested fix in response to a user input accepting the suggested fix, or automatically implementing the suggested fix.

2. The computerized method of claim 1, wherein the error is at least one of: a compile time error of the code or a run time error of the code.

3. The computerized method of claim 2, wherein determining the error message from the log comprises:
   executing a semantic search or a regular expression ("regex") search on the log to identify the error message, wherein the error message comprises one or more text strings.

4. The computerized method of claim 3, wherein the one or more text strings comprises at least one of: a natural language word, a natural language phrase, or a natural language sentence that indicates an occurrence of the error.

5. The computerized method of claim 1, wherein determining the context associated with the error comprises:
   generating, based at least in part on the error message, one or more search criteria; and
   executing, using at least the one or more search criteria, a similarity search in a set of documents to identify the portions of the one or more documents associated with the code.

6. The computerized method of claim 5, wherein the similarity search comprises execution of a document search model, and wherein the computerized method further comprises:
   generating the document search model, wherein generating the document search model comprises:
   chunking the set of documents into a plurality of portions of the set of documents; and
   vectorizing the plurality of portions of the set of documents to generate a plurality of vectors.

7. The computerized method of claim 6, wherein executing the similarity search comprises using at least one of: a language model, an artificial intelligence ("AI") model, a generative model, a machine learning ("ML") model, a neural network ("NN"), or another LLM.

8. The computerized method of claim 7, wherein the portions of the one or more documents associated with the code comprise a quantity n portions of the one or more documents most associated with the code.

9. The computerized method of claim 8, wherein the context associated with the error comprises one or more citations to the one or more documents.

10. The computerized method of claim 9, wherein the context associated with the error comprises extended portions of the log that are adjacent to the error message in the log.

11. The computerized method of claim 10, wherein the context associated with the error comprises a portion of the code associated with the error.

12. The computerized method of claim 11, wherein determining the context associated with the error comprises:
   accessing the code from a repository that stores the code; and
   identifying, based on the error message, the portion of the code associated with the error.

13. The computerized method of claim 12, wherein the portion of the code associated with the error comprises a difference between multiple versions of at least a section of the code.

14. The computerized method of claim 13, wherein the prompt further comprises at least: one or more instructions that instruct the LLM to generate the explanation of the error message and/or the suggested fix for the error based on the error message and the context associated with the error.

15. The computerized method of claim 14 further comprising:
   providing, via a user interface, the output from the LLM.

16. The computerized method of claim 15, wherein the suggested fix comprises a modification to at least a section of the code.

17. A system comprising:
   one or more computer-readable storage media having program instructions embodied therewith; and
   one or more processors configured to execute the program instructions to cause the system to perform the computerized method of claim 1.

18. A computer program product comprising one or more computer-readable storage media having program instructions embodied therewith, the program instructions executable by one or more processors to cause the one or more processors to perform the computerized method of claim 1.

* * * * *